US009146333B2

(12) United States Patent
Slapal et al.

(10) Patent No.: US 9,146,333 B2
(45) Date of Patent: Sep. 29, 2015

(54) SYSTEMS AND METHODS FOR COLLECTING MEASUREMENTS AND/OR SAMPLES FROM WITHIN A BOREHOLE FORMED IN A SUBSURFACE RESERVOIR USING A WIRELESS INTERFACE

(71) Applicant: SCHLUMBERGER TECHNOLOGY CORPORATION, Sugar Land, TX (US)

(72) Inventors: Miroslav Slapal, Hodonin (CZ); Julian Pop, Houston, TX (US); Jean Louis Pessin, Amiens (FR); Stephen Yeldell, Sugar Land, TX (US); Ramon Hernandez-Marti, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 259 days.

(21) Appl. No.: 13/658,395

(22) Filed: Oct. 23, 2012

(65) Prior Publication Data

US 2014/0111347 A1 Apr. 24, 2014

(51) Int. Cl.
*G01V 3/30* (2006.01)
*E21B 34/14* (2006.01)
*E21B 47/12* (2012.01)
*E21B 49/08* (2006.01)

(52) U.S. Cl.
CPC ................ *G01V 3/30* (2013.01); *E21B 47/122* (2013.01); *E21B 49/088* (2013.01)

(58) Field of Classification Search
CPC ........ G01V 3/30; G01V 11/002; E21B 34/08; E21B 47/12; E21B 47/122
USPC ............. 166/100, 250.01, 250.17; 340/539.1, 340/854.6, 855.4; 367/82
See application file for complete search history.

(56) References Cited

U.S. PATENT DOCUMENTS

| | | | |
|---|---|---|---|
| 2,747,401 A | 5/1956 | Doll | |
| 5,549,159 A | 8/1996 | Shwe et al. | |
| 6,125,934 A * | 10/2000 | Lenn et al. ................ | 166/250.12 |
| 6,234,257 B1 | 5/2001 | Ciglenec et al. | |
| 6,522,119 B1 | 2/2003 | Hernandez | |
| 6,585,045 B2 | 7/2003 | Lee et al. | |
| 6,841,984 B2 | 1/2005 | Hernandez | |
| 7,787,525 B1 | 8/2010 | Clark, Jr. et al. | |
| 2002/0112854 A1* | 8/2002 | Krueger et al. .......... | 166/250.07 |

(Continued)

OTHER PUBLICATIONS

International Search Report & Written Opinion issued in PCT/US2013/065366 on Apr. 23, 2014; 14 pages.

*Primary Examiner* — Benjamin C Lee
*Assistant Examiner* — Stephen Burgdorf
(74) *Attorney, Agent, or Firm* — Kenneth L. Kincaid; Cathy Hewitt

(57) ABSTRACT

A system and method collects one or more measurements within a borehole formed in a subsurface reservoir. The system and method provides a first downhole component having an expandable element and a first port formed in a layer of the expandable element. A wireless transceiver is connected to the first downhole component, wherein the wireless transceiver is adapted to transmit one or more wireless signals within the borehole. A first wireless sensor located at the first port and remotely with respect to the wireless transceiver, wherein the first wireless sensor is configure to receive the one or more wireless signals and collect at least one measurement within the borehole or perform at least one task related to the borehole or subsurface reservoir about the borehole.

20 Claims, 11 Drawing Sheets

(56) References Cited

U.S. PATENT DOCUMENTS

| | | |
|---|---|---|
| 2004/0231842 A1* | 11/2004 | Shammai et al. ............. 166/264 |
| 2005/0115716 A1 | 6/2005 | Ciglenec et al. |
| 2005/0229680 A1* | 10/2005 | Kfoury et al. ..................... 73/38 |
| 2007/0215348 A1* | 9/2007 | Corre et al. .................. 166/264 |
| 2008/0053652 A1* | 3/2008 | Corre et al. .................. 166/179 |
| 2008/0066536 A1* | 3/2008 | Goodwin et al. .......... 73/152.24 |
| 2008/0078581 A1* | 4/2008 | Goodwin et al. ............... 175/50 |
| 2008/0115575 A1* | 5/2008 | Meek et al. ................ 73/152.24 |
| 2009/0033516 A1* | 2/2009 | Alteirac et al. ............ 340/853.2 |
| 2009/0200016 A1 | 8/2009 | Goodwin et al. |
| 2009/0211756 A1* | 8/2009 | Goodwin et al. ............. 166/264 |
| 2010/0051266 A1 | 3/2010 | Roddy et al. |
| 2010/0083748 A1* | 4/2010 | Kerr et al. .................. 73/152.26 |
| 2010/0116494 A1* | 5/2010 | Fox et al. ...................... 166/264 |
| 2010/0122812 A1 | 5/2010 | Corre et al. |
| 2010/0236774 A1* | 9/2010 | Patel et al. ....................... 166/66 |
| 2010/0319912 A1* | 12/2010 | Pop et al. ...................... 166/264 |
| 2011/0277999 A1 | 11/2011 | Corre et al. |
| 2012/0166089 A1 | 6/2012 | Ramshaw et al. |
| 2013/0311099 A1* | 11/2013 | Eyuboglu et al. ................ 702/11 |
| 2015/0068736 A1* | 3/2015 | Dirksen et al. ........... 166/250.01 |

* cited by examiner

SYSTEMS AND METHODS FOR COLLECTING MEASUREMENTS AND/OR SAMPLES FROM WITHIN A BOREHOLE FORMED IN A SUBSURFACE RESERVOIR USING A WIRELESS INTERFACE

CROSS REFERENCE TO RELATED APPLICATIONS

None.

FIELD OF THE INVENTION

Aspects relate to methods and apparatus for sampling technology. More specifically, aspects relate to methods and apparatus related to downhole sampling technology.

BACKGROUND INFORMATION

A downhole formation testing tool is often used to study flow properties of a formation below the Earth's crust. The downhole formation testing tool is configured to create a flow pulse in the formation and to measure a pressure response of the formation at one or more locations along a wellbore penetrating the porous formation. The flow pulse may be performed using a pump fluidly coupled to the porous formation. The pressure response is often measured with one or more gauges in fluid communication with the porous formation.

When using a known downhole formation testing tool having an extendable probe to create flow pulses, the drawdown pressure generated during, the drawdown is relatively large because of the relatively small flow area between a probe port and the porous formation. Such relatively large drawdown pressure often results in a large amount of electrical power being consumed by the pump. Additionally, pump components may heat during the drawdown. As a result, a duration of the flow pulse may be shortened to prevent failures due to excessive temperatures. Conversely, if the amount of electrical power is limited, the relatively large drawdown pressure results in a relatively low flow rate during the drawdown. In both cases, that is, when flow pulses are shorter or when flow pulses have flow rates of reduced magnitude, pressure responses of the porous formation have also reduced magnitude, or the responses are even undetectable at remote locations.

When an inflatable dual packer testing tool is used to create a flow pulse, the flow area is increased which may alleviate the need for a large amount of electrical power. The inflatable dual packer elements, however, may not be capable of withstanding pressure differences with the wellbore as large as probe seals, and again, the flow rate during flow pulses may have to be limited in magnitude, with similar consequences on the magnitudes of the pressure responses.

Whether using extendable probes, inflatable packers or combinations of extendable probes and inflatable packers, measuring the formation response at locations axially close to each other, such as less than one foot apart which is mostly due to a size of packer elements and/or probe deployment, systems, is often difficult. As a result, characterizing the flow of fluid in the formation near a wall of the wellbore may be difficult which may impact the ability to determine the flow characteristics of the formation [and therefore its economic viability]. Moreover, pressure equilibrium between pressure in a sealed volume, which communicates flow with the porous formation, and pressure in the porous formation near the wall may require a long duration of time to be established. As a result, monitoring the pressure in the porous formation with gauges of known downhole formation testing tools is difficult or unachievable.

SUMMARY

In an embodiment, a system collects measurements within a borehole formed in a subsurface reservoir and has a first downhole component having an expandable element with a first port formed in a layer of the expandable element. A transceiver is connected to the first downhole component, wherein the transceiver transmits at least one signal within the borehole. A first sensor is located at the first port and is located remotely with respect to the transceiver. In an embodiment, the transceiver may be a wireless transceiver, and the sensor may be a wireless sensor. The first sensor receives the signals and/or collects a measurement within the borehole or performs a task related to the borehole or subsurface reservoir about the borehole.

In another embodiment, a method collects measurements within a borehole formed in a subsurface reservoir and provides a wireless transceiver within the borehole. An outer surface of a downhole component extends to be adjacent to at least a portion of a wall of the borehole, wherein the downhole component has a first port formed at the outer surface and a first wireless sensor located at the first port. The first wireless sensor actuates via at least one wireless signal received from the wireless transceiver such that the wireless sensor collects a measurement within the borehole or performs a task within the borehole.

In yet another embodiment, a method collects measurements within a borehole formed in a subsurface reservoir. An outer surface of a first downhole component extends to abut at least a portion of a wall of the borehole, wherein the first downhole component has a primary port having a first wireless sensor and a secondary port having a second wireless sensor. The first downhole component, the first wireless sensor and/or the second wireless sensor actuates via signals transmitted from a wireless transceiver such that the first downhole component, the first wireless sensor and/or the second wireless sensor performs a task within the borehole. Fluid flow within the borehole or reservoir is controlled based on the task performed at the first downhole component, the first wireless sensor and/or the second wireless sensor.

BRIEF DESCRIPTION OF THE DRAWINGS

So that the features and advantages of the present disclosure can be understood in detail, a more particular description of the systems and methods may be had by reference to the embodiments thereof that are illustrated in the appended drawings. It is to be noted, however, that the appended drawings illustrate some embodiments of the present systems and methods and are therefore not to be considered limiting of its scope, for the systems and methods may admit to other equally effective embodiments.

DETAILED DESCRIPTION

Systems and methods having one or more sensors and/or ports may collect one or more measurements and/or samples which may be associated with one or more characteristics and/or properties relating to a subsurface geological formation or reservoir. The one or more sensors may be associated with at least one downhole component which may be positioned within a borehole formed within the reservoir for collecting the one or more measurements and/or samples. The downhole component may have at least one port which may be positioned adjacent to a wall of the reservoir for collecting the one or more measurements and/or samples. Further, die one or more sensors may be associated with the at least one port of the downhole component for collecting the one or more measurements and/or samples when the downhole component may be positioned within borehole. Moreover, the one or more sensors may be adapted and/or configured for wired and/or wireless communication of data and/or information associated with the one or more collected measurements and/or samples. The one or More sensors may communicate with a transceiver, located locally or remotely with respect to the one or more sensors, via wired communication or wireless communication.

Figure 1:
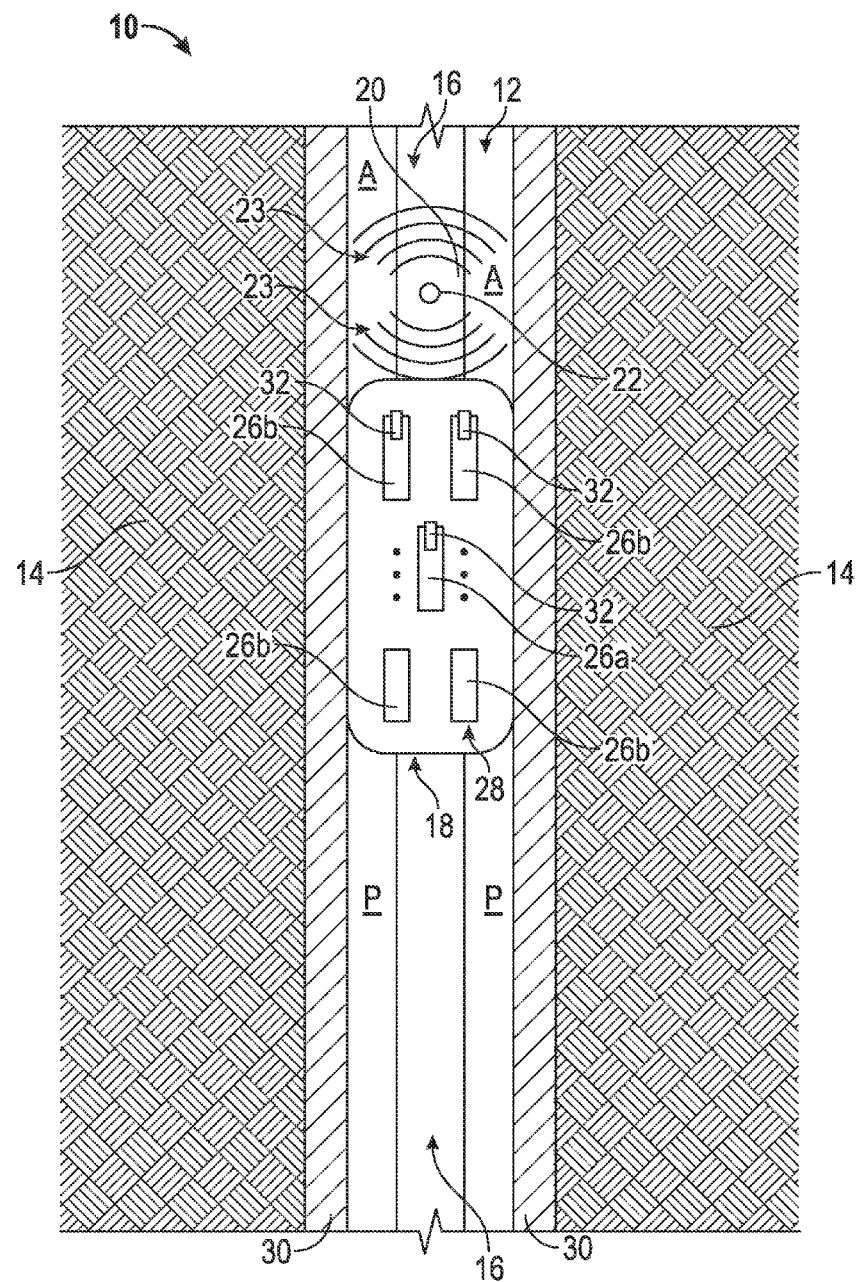
FIG. 1 illustrates a cross-sectional view of a schematic diagram of a system in accordance with an embodiment.

Referring now to the drawings wherein like numerals refer to like parts, FIG. 1 illustrates a wellsite system 10, which may be located onshore or offshore, in which the present systems and methods for collecting one or more measurements, data, information and/or samples may be employed and/or practiced. A wellbore or borehole 12 (hereinafter "borehole 12") may be drilled and/or formed within a subsurface, porous formation or reservoir 14 (hereinafter "reservoir 14") by one or more known drilling techniques. The borehole 12 may be drilled into or formed within the reservoir 14 to recover and/or collect deposits of hydrocarbons, water, gases, such as, for example, non-hydrocarbon gases and/or other desirable materials trapped within the reservoir 14. The borehole 12 may be drilled or formed to penetrate the reservoir 14 which may contain the trapped hydrocarbons, and/or other desirable materials, such as, for example, gases, water, carbon dioxide and/or the like. As a result, the trapped hydrocarbons and/or other desirable materials may be released from the reservoir 14 and/or may be recovered or collected via the borehole 12.

Embodiments of the present systems and methods may be utilized during and/or after one or more vertical, horizontal and/or directional drilling operations or combinations thereof. As a result, the borehole 12 may be a vertical borehole, a horizontal borehole, an inclined borehole or may have any combination of vertical, horizontal and inclined portions. The wellsite system 10 may be used as an example system in which the present systems and methods may be incorporated and/or utilized, but a person having ordinary skill in the art will understand that the present systems and methods may be utilized during and/or after any known drilling operation and/or downhole application, as known to one having ordinary skill in the art, such as, for example, logging, formation evaluation, drilling, sampling, reservoir testing, completions, flow assurance, production optimization, cementing and/or abandonment of the borehole 12.

The wellsite system 10 may have a first downhole component 16 (hereinafter "first component 16") which may be positioned and/or located within the borehole 12 and/or adjacent to the reservoir 14 as shown in FIG. 1. A second downhole component 18 (hereinafter "second component 18") may be located and/or positioned in proximity to the first component 16 in the borehole 12. In embodiments, the second component 18 may be attached, connected and/or mounted to the first component 16 as shown in FIG. 1. The lint component 16 and/or the second component 18 (collectively known hereinafter as "first and second components 16, 18") may be adapted and/or configured to collect one or more measurements, data and/or samples (hereinafter "one or more measurements") associated with and/or based on one or more characteristics and/or properties relating to the borehole 12 and/or the reservoir 14 (collectively known hereinafter as "characteristics of the reservoir 14").

The first, and second components 16, 18 may be and/or may include, for example, one or more downhole tools and/or devices which may be lowered and/or run into the borehole 12. For example, the first and second components 16, 18 may be a downhole formation testing tool which may be configured to conduct, execute and/or complete one or more downhole tests, such as, for example, a local production test, a buildup test, a drawdown test, an injection test, an interference test and/or the like. The interference test may include, for example, an interval pressure transient test (hereinafter "IPTT test") and/or a vertical interference test. It should be understood that the one or more downhole tests which may be conducted by the first and second components 16, 18 may be any downhole tests as known to one of ordinary skill in the art.

Figure 3:
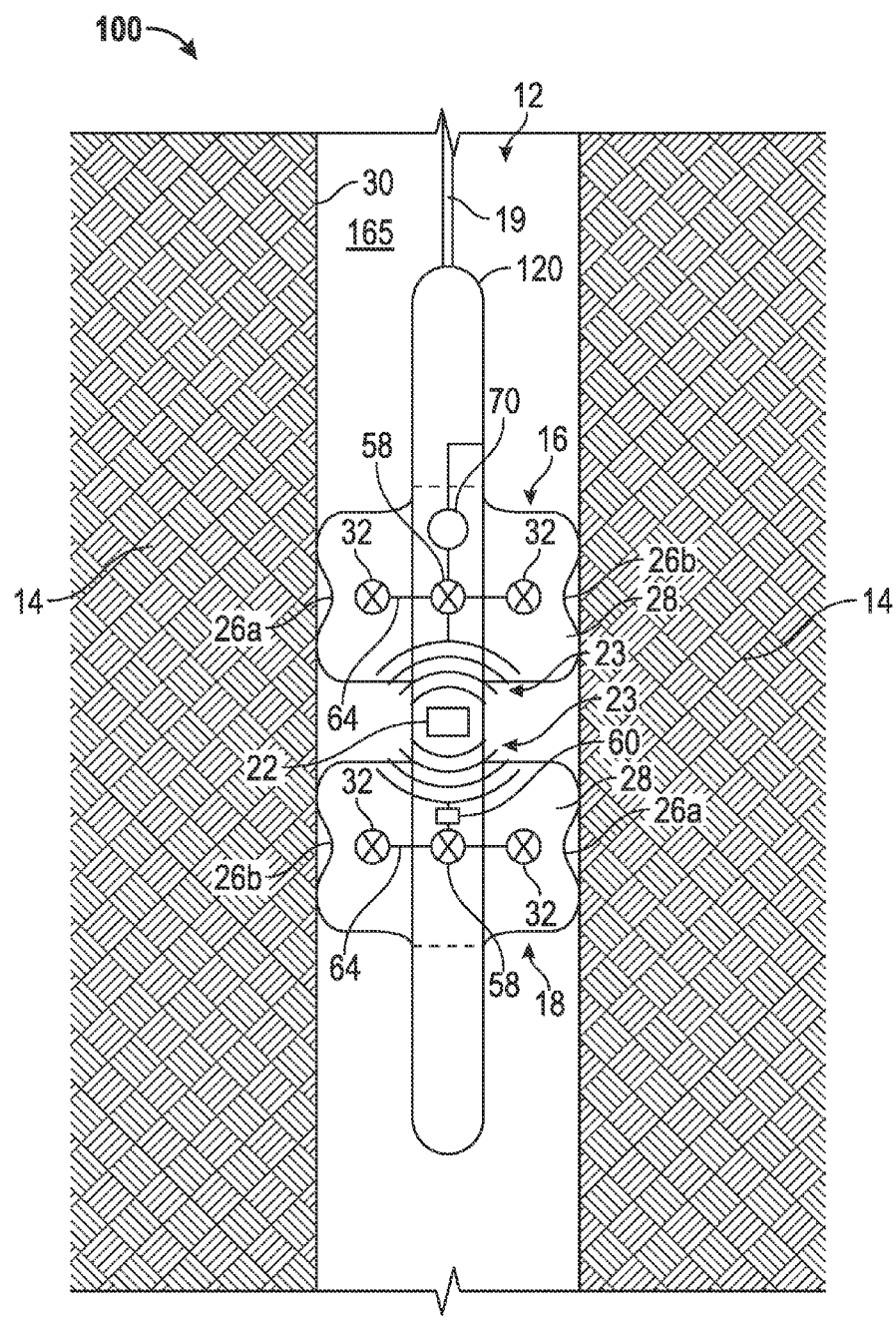
FIG. 3 illustrates a cross-sectional view of a schematic diagram of a system in accordance with an embodiment.

The first and second components 16, 18 may be conveyed into the borehole 12 by any known conveyance, such as drill pipe, coiled tubing, wireline, slickline, cable or any other type of conveyance, in embodiments, the first and second components 16, 18 may be conveyed into the borehole 12 via a wireline cable 19 as shown in FIG. 3. As a result, the first and second components 16, 18 may be positionable and/or locatable within the borehole 12 and/or adjacent to one or more borehole walls 30 (hereinafter "walls 30") of the borehole 12. In embodiments, the first and second components 16, 18 may be configurable to collect one or more measurements relating to the borehole 12, the reservoir 14 and/or the walls 30 (collectively known hereinafter as "the well/reservoir system 12, 14, 30").

For example, the first and second components 16, 18 may be configured to collect pressure data and/or measurements relating to the well/reservoir system 12, 14, 30. The first and second components 16, 18 may be for example, a formation testing tool configured to collect the pressure data and/or measurements relating to the well/reservoir system 12, 14, 30. The first and second components 16, 18 may be connected to and/or incorporated into, for example, a drill string, a test string or a tool string.

In embodiments, the first and second components 16, 18 may be connected to and/or incorporated into, for example, a modular formation dynamic tester (hereinafter "MDT") test string. The drill string, test string or tool string may include one or more additional downhole components (hereinafter "additional components"), such as, for example, drill pipe, one or more drill collars, a mud motor, a drill bit, a telemetry module, an additional downhole tool and/or one or more downhole sensors. It should be understood that the drill string, test string or tool string may include any number of and/or any type of additional downhole components as known to one of ordinary skill in the art.

In embodiments, the first and second components 16, 18 may be a wireline configurable tool which is a tool commonly conveyed in the wellbore 12 by, for example, the wireline cable 19. For example, the wireline configurable tool may be an MDT tool for formation testing, or a logging tool or testing, tool for sampling or measuring properties and/or characteristics associated with the well/reservoir system 12, 14, 30. It should be understood that the first and second components 16, 18 may be any wireline configurable tool as known to one or ordinary skill in the art.

Figure 2:
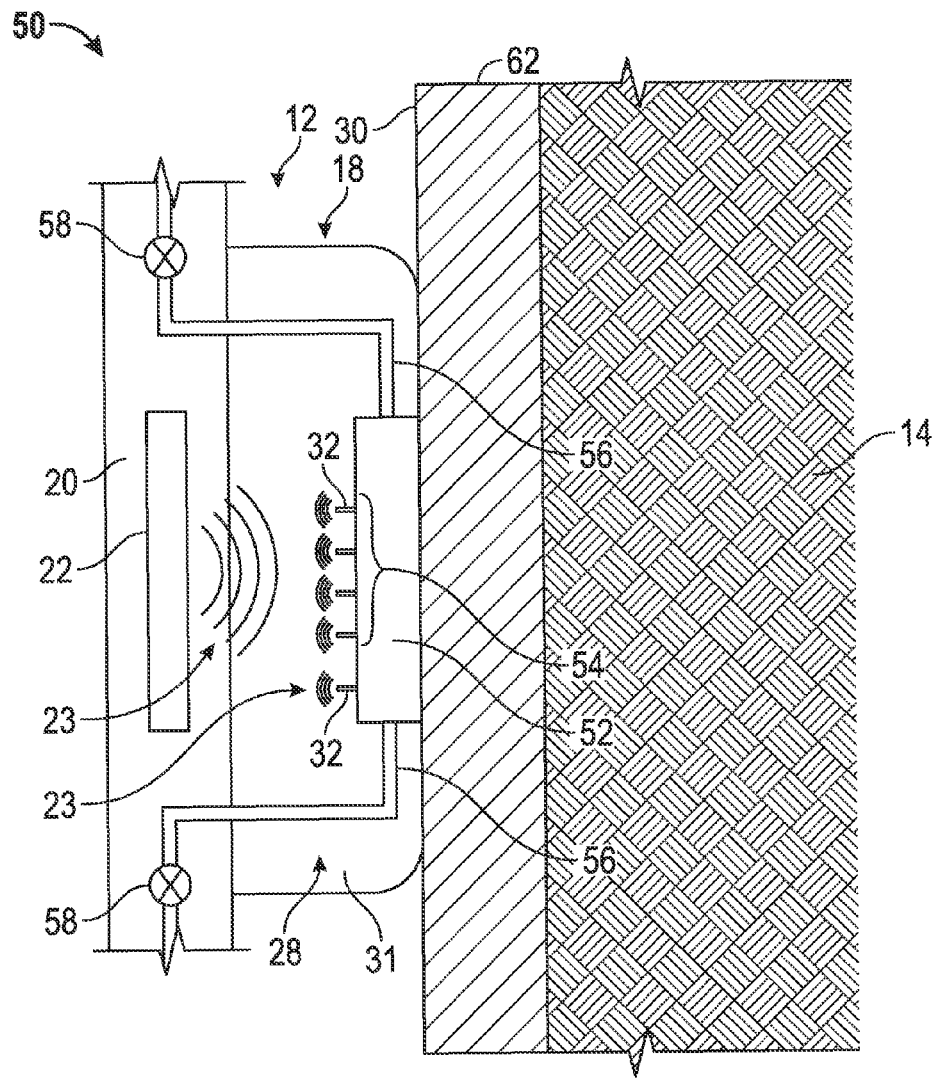
FIG. 2 illustrates a cross-sectional view of a schematic diagram of a system in accordance with an embodiment.

In embodiments, the first and second components 16, 18 may have one or more detectors, gauges and/or sensors 32 (hereinafter "sensors 32"). The sensors 32 may be configured and/or adapted for wired and/or wireless communication of one or more measurements associated with and/or based on the characteristics of the reservoir 14 which may be collected by the sensors 32. For example the sensors 32 may be one or more wireless sensors, such as for example, one or more wireless microelectromechanical system sensors. In embodiments, the first component 16 ma be connected to the power source (not shown in the drawings) and/or may be an electrically powered control tool or device. Further, the first and second components 16, 18 may be adapted to and/or configured for transmitting, receiving and/or communicating one or more wireless power signals and/or wireless communication signals (collectively known hereafter as "wireless signals"). For example, the second component 18 may include the sensors 32 and the first component 16 may be configured to transmit wired and/or wireless signals to the second component 18 and/or the sensors 32 as shown in FIGS. 1 and 2. As a result, the wired and/or wireless signals transmitted to the second component 18 and/or sensors 32 may stimulate, activate and/or actuate the second component 18, at least one of the sensors 32 and/or a secondary power source (not shown in the drawings). In an embodiment, the secondary power source may be activated by the wired and/or wireless signals and may actuate the second component 18 and/or at least one of the sensors 32. Upon being actuated, the second component 18 and/or sensors 32 may perform, execute and/or complete the one or more tasks and/or may detect and/or collect the one or more measurements relating to the characteristics of the reservoir 14 and/or the well/reservoir system 12, 14, 30. As a result, the second component 16 and/or sensors 32 may be controlled and/or instructed by the first component 16 via the transmitted wired and/or wireless signals. In embodiments, the one or more tasks performed, executed and/or completed by the second component 18 and or sensors 32 may control fluid flow within the borehole 12 and/or the reservoir 14. Moreover, the first and second components 16, 18 and/or sensors 32 may be configured and/or adapted to log, index and/or store the one or more measurements that may be collected by the second component 18 and/or sensors 32.

In embodiments, the first component 16 ma have a mandrel 20 and/or a wireless transceiver 22 (hereinafter "transceiver 22"). The transceiver 22 may be contained or located within or positioned or located on or in the mandrel 20 of the first, component 16 as shown in FIGS. 1 and 2. In embodiments, the one or more sensors 32 may be located remotely with respect to the mandrel 20 and/or the transceiver 22. The transceiver 22 may be, for example, a wireless electromagnetic transceiver. The transceiver 22 may be configured and/or adapted to transmit and/or receive wireless signals. As a result, the transceiver 22 may transmit wireless signals into and/or within the borehole 12 and/or to the second component 18 and/or sensors 32. Moreover, the transceiver 22 may also be configured and/or adapted to receive wireless signals from within the borehole 12 and/or from the second component 18 and/or sensors 32.

The mandrel 20 and/or the transceiver 22 may utilize one or more wireless power techniques and/or one or more wireless communication techniques (hereinafter "wireless techniques") to transmit and/or receive wireless signals. For example, the wireless techniques may include wireless electromagnetic communication and the mandrel 20 and/or transceiver 22 may generate, provide and/or create an electromagnetic field 23 within the borehole 12 for transmitting and/or receiving wireless signals within the borehole 12. The mandrel 20 and/or the transceiver 22 may transmit and/or receive, for example, one or more electromagnetic signals or waves to transmit and/or receive wireless signals via the electromagnetic field 23. The electromagnetic signals or waves may include, for example, radio signals, acoustic signals, infrared signals, ultrasonic signals, microwave signals and/or the like. In embodiments, the mandrel 20 and/or the transceiver 22 may be or may include at least one electromagnetic source and/or electromagnetic, antenna. The present disclosure should not be deemed as limited to a specific embodiment of the one or more wireless techniques and/or the electromagnetic signals or waves which may be utilized by the transceiver 22 for transmitting and/or receiving the wireless signals within the borehole 12.

In embodiments, transmission of the wireless signals between the first and second component 16, 18, transceiver 22 and/or sensors 32 may be provided by, executed with and/or based on, for example, induction, resonant inductive coupling, inductive power transfer, electrodynamic inductive effect, laser beams and/or evanescent wave coupling. In embodiments, the transmission of the wireless signals may be based on a strong coupling between electromagnetic resonant objects, such as the first and second components 16, 18, transceiver 22 and/or sensors 32 to wirelessly transfer wireless signals. The first and second components 16, 18, transceiver 22 and/or sensors 32 may contain one or more magnetic loop antennas (not shown in the drawings) which may be tuned to the same or substantially the same frequency. As a result of the magnetic loop antennas being tuned to the same or substantially the same frequency, strong-coupled resonances may be achieved and/or provided between, for example, the first and second components 16, 18, transceiver 22 and/or sensors 32 to achieve power-transmission efficiency between the first and second components 16, 18, transceiver 22 and/or sensors 32. Moreover, transmission of wireless signals may be embedded into and or included with the power transmission between the first and second components 16, 18, transceiver 22 and/or sensors 32. In embodiments, the wireless signal transfer technology may be, for example, similar to WiTricity or a wireless resonant energy link.

In embodiments, the second component 18 may be a downhole tool or device, such as, for example, a single packer component, element, device or tool (hereinafter "single packer element") which may be mounted to the first component 16 and/or to the mandrel 20 of the first component 16 as shown in FIGS. 1 and 2. For example, the second component 18 may be an inflatable packer component, element, device or tool (hereinafter "inflatable packer element") having one or more primary intakes or ports 26a (hereinafter "primary ports 26a"), one or more secondary intakes or ports 26b (hereinafter "secondary ports 26b") and/or at least one packer element 28 (hereinafter "packer element 28") as shown in FIGS. 1 and 2. In embodiments, the primary ports 26a may be sample or producing inlets and the secondary ports 26b may be guard inlets.

In embodiments, the second component 18 may be configured such that the secondary ports 26b may be located around and/or may surround the primary ports 26a; however, the second component 18, in embodiments, may be configured such that the primary ports 26a may be located and/or positioned adjacent to one or more of the secondary ports 26b. The packer element 28 of the second component 18 may be made of, for example, a flexible and/or elastomeric material for squeezing, inflating and/or expanding the packer element 28. The packer element 28 may be squeezed, inflated and/or expanded to contact, abut and/or be adjacent to at least a portion of the walls 30 of the reservoir 14 as shown in FIGS. 1 and 2. The inflatable packer element may be any inflatable and/or expandable packer element as known to one of ordinary skill in the art.

In embodiments as shown in FIGS. 1 and 2, the second component 18 may be, for example, an MDT inflatable packer element having the primary ports 26a and the secondary ports 26b (collectively known hereinafter as "primary and secondary ports 26a, 26b) formed and/or disposed around a circumference of the second component 18. One or more of the primary ports 26a may be, for example, hydraulically isolated and/or separated from one or more of the secondary ports 26b. The primary and secondary ports 26a, 26b may be formed within and/or embedded within a layer 31 of the second component 18 and/or the packer element 28 of the second component 18 as shown in FIG. 2. The layer 31 of the packer element 28 may be for example, a rubber layer, a inflatable layer, an expandable layer and/or the like. The primary and secondary ports 26a, 26b may be positioned or configured in a first pattern which may extend circumferentially around the second component 18, the packer element 28 or the layer 31 of the second component 18. As a result of the first pattern of the primary and secondary ports 26a, 26b, one or more of the secondary ports 26b may be positioned and/or located above and/or below one or more of the primary ports 26a as shown in FIG. 1. The second component 18 may have a ratio of the primary ports 26a to the secondary ports 26b which may be dependent upon a downhole application in which the second component 18 may be deployed to achieve or accomplish within the borehole 12. In embodiments, the first pattern of the primary and secondary ports 26a, 26b of the second component 18 may be such that the secondary ports 26b may be located symmetrically with respect to one or more of the primary ports 26a. A second pattern of the primary and secondary ports 26a, 26b (not shown in the drawings) may provide asymmetrical location of the secondary ports 26b with respect to the primary ports 26a. It should be understood that the primary and secondary ports 26a, 26b may be located and/or positioned in any pattern.

At least one of the sensors 32 of the second component 18 may be associated with, contained within and/or located at or adjacent to at least one or more of the primary and secondary ports 26a, 26b as shown in FIGS. 1 and 2. The first component 16, second component 18 and/or sensors 32 may be configured and/or adapted to detect, collect, index, log and/or store the one or more measurements, associated with the characteristics of the reservoir 14 or the well/reservoir system 12, 14, 30, at, near or adjacent to the primary and secondary ports 26a, 26b. The first component. 16, second component 18 and/or sensors 32 may detect, collect, index, log and/or store the one or more measurements which may relate to and/or may concern the operation, maintenance and/or drilling of the wellsite system 10 and/or well/reservoir system 12, 14, 30. Moreover, the first component 16, second component 18 and/or sensors 32 may detect, collect, index log and/or store any number(s) and/or type(s) of measurements, data and/or samples associated with characteristics of the well/reservoir system 12, 14, 30.

The one or more measurements, which may be detected, collected, indexed, logged and/or stored by the first component 16, second component 18 and/or sensors 32 may include, for example, density measurements, viscosity measurements, resistivity measurements, conductivity measurements, dielectric measurements, magnetic resonance measurements, temperature measurements, sound measurements, vibration measurements, pressure measurements, optical measurements, motion-related measurements, flow-related measurements, flow rate measurements, sample assurance measurements, fluid analysis and/or composition measurements calorimetric measurements, vacuum insulated tubing measurements, transmission and/or attenuation measurements, timing measurements, static measurements, transient measurements and/or the like. The one or more measurements may be associated with and/or related to one or more analytical or testing techniques, such as, for example, a pressure transient test, a tracer monitoring test, a compositional fluid analysis and/or the like. It should be understood that the analytical or testing techniques and/or measured characteristics of the well/reservoir system 12, 14, 30 may be any analytical or testing techniques and/or measured characteristics as known to one of ordinary skill in the art.

In embodiments, the wellsite system 10 and/or the first and second components 16, 18 may include and/or may be connected to a telemetry system (not shown in the drawings) to provide an interface for electronic communications between the Earth's surface and the first and second components 16, 18. The telemetry system may comprise one or more of the following telemetry systems: mud pulse telemetry, acoustic telemetry, electromagnetic telemetry, wireline telemetry, optical telemetry or any other telemetry system. One or more operators at the Earth's surface may control, operate, instruct and/or manipulate the first component 16, second component 18 and/or sensors 32 via the telemetry system. The present disclosure should not be deemed limited to a specific embodiment of the telemetry system that may be utilized by the wellsite system 10 and/or the first and second components 16, 18.

The second component 18 and/or the sensors 32 may be configured and/or adapted to receive wireless signals from the first component 16 and/or the transceiver 22. As a result, the first component 16 and/or transceiver 22 may control, operate or instruct and/or electrically power or actuate the second component 18 and/or sensors 32 via wireless signals transmitted to and/or received by the second component 18 and/or sensors 32. Further, one or more tasks may be performed, executed and/or completed by the second component 18 and/or sensors 32 based on the wireless signals transmitted from the first component 16 and/or transceiver 22. Still further, the one or more measurements may be detected, collected, indexed, logged and/or stored by the second component 18 and/or sensors 32 based on the wireless signals transmitted from the first component 16 and/or transceiver 22. In embodiments, the first component 16 may be configured to index, log and/or store the one or more measurements which may be collected by the second component 18 and/or the sensors 32. Moreover, the first component 16 and/or transceiver 22 may provide wireless electrical power to the second components 18 and/or sensors 32 for performing, executing and/or completing the one or more tasks and/or for collecting, indexing, logging and/or storing the one or more measurements.

The first component 16, second component 18, transceiver 22 and/or sensors 32 may be configured and/or adapted to index wireless signals being transmitted and or received within the borehole 12. The indexed wireless signals may identify a location of the sensors 32 with respect to at least one of the primary and secondary ports 26a, 26b. As a result, the one or more measurements collected by the second component 18 and/or sensors 32 may be associated with and/or matched to at least one of the primary and secondary ports 26a, 26b and/or at least one of the sensors 32 via the indexed wireless signals being transmitted within the borehole 12. In embodiments, the second component 18 may be configured to collected one or more samples, such as, for example, one or more formation fluid or gas samples while positioned within the borehole 12 via one or more of the primary and secondary ports 26a, 26b. The one or more tasks that may be performed, executed and/or completed by the second components 18 and/or sensors 32 may be any downhole task as know to one of ordinary skill in the art.

As shown in FIGS. 1 and 2, the first and second components 16, 18 may be positioned within the borehole 12 and/or in proximity and/or adjacent to the reservoir 14 and/or at least one of the walls 30 of the reservoir 14. After the first and second components 16, 18 may be positioned in borehole 12, the first component 16 and/or transceiver 22 may be in communication with the second component 18 and/or sensors 32 via the electromagnetic field 23 which may be produced and/or generated by the transceiver 22 and/or first component 16. The transceiver 22 and/or first component 16 may transmit the wireless signals to the second component 18 and/or sensors 32 via the electromagnetic field 23. The wireless signals may be received by the sensors 32 and/or second component 18 from the transceiver 22 and/or first component 16 via the electromagnetic field 23. As a result, the second component 18 and/or sensors 32 may utilize the wireless signals and/or may perform, execute and/or complete the one or more tasks within the borehole 12, such as, for example, detecting, collecting, indexing, logging and/or storing the one or more measurements associated with the characteristics of the well/reservoir system 12, 14, 30.

The second component 18 and/or sensors 32 may receive the wireless signals, which may include at least one wireless power signal transmission, and may convert the at least one wireless power signal transmission into electrical power for powering, actuating and/or operating the second component 18 and/or sensors 32. The second components 18 and/or sensors 32 may be actuated and/or operated with and/or powered by the converted electrical power received, via the wireless signals, from the first component 16 and/or transceiver 22. As a result, the second component 18 and/or sensors 32 may perform and/or complete the one or more tasks in accordance with one or more received wireless signals and/or may detect, collect, log, index and/or store the one or more measurements associated with the characteristics of the well/reservoir system 12, 14, 30. Moreover, the second component 18 and/or the primary and secondary ports 26a, 26b may collect the one or more samples within the borehole 12 based on the wireless signals received from the transceiver 22 and/or first component 16.

The second component 18 and/or sensors 32 may generate, produce and/or transmit data and/or information to the first component 16 and/or transceiver 22 via the electromagnetic field 23. The data and/or information received by the first component 16 and/or transceiver 22 from the second component 18 and/or sensors 32 may be associated with, based on and/or relating to the one or more measurements collected by the second component 18 and/or sensors 32. Moreover, the data and/or information may be associated with, based on and/or relating to the one or more samples collected by the second component 18 and/or primary and secondary ports 26a, 26b.

The electromagnetic field 23 generated by the first component 16 and/or the transceiver 22 may provide for bidirectional wireless communication between the first component 16 and/or transceiver 22 and the second component 18 and/or sensors 32. After receiving the data and/or information from the second component 18 and/or sensors 32, the first component 16 and/or transceiver 22 may process, index, log and/or store the received, data and/or information. Moreover, the first component 16 and/or transceiver 22 may transmit at least one communication signal, which may include the received data and/or information, to the telemetry system for subsequent transmission uphole to the Earth's surface. As a result, the received data and/or information associated with the second component 18 and/or sensors 32, based on and/or relating to the completed tasks and/or the one or more collected measurements and/or samples, may be communicated to the Earth's surface 28 via the telemetry system.

In embodiments, the second component 18 and/or sensors 32 may collect, log, index and/or store one or more measurements associated with one or more conditions which may be present at, near and/or adjacent to the primary and secondary ports 26a, 26b and/or sensors 32 within the borehole 12. The second component 18 and/or the sensors 32 may collect, log, index and/or store data and/or information relating to collected measurements and transmit the collected data and/or information to first component 16 and/or transceiver 22 via the electromagnetic field 23. The one or more wireless signals, data and/or information received by the transceiver 22 and/or first component 16 may be indexed by the first and second components 16, 18, transceiver 22 and/or sensors 32 such that the received wireless signals, data and/or information ma be matched to at least one sensor 32 and/or at least one of the first and second ports 26a, 26b where the one or more measurements may have been collected by the sensors 32.

The first and second components 16, 18, transceiver 22, packer element 28 and/or sensors 32 may perform, execute and/or complete the one or more tasks which may be related to, for example, controlling and/or managing fluid flow within the borehole 12. As a result, the first and second components 16, 18, transceiver 22, packer element 28 and/or sensors 32 may, for example, control and/or manage fluid flow of fluids within the borehole 12 and/or trapped within the reservoir 14. The one or more tasks performed, executed and/or completed by the first and second components 16, 18 may operate and/or control the packer element 28. The packer element 28 may be expanded and/or inflated, and the second component 18 and/or packer element 28 may enable efficient fluid flow from the reservoir 14 and/or fluid injection into the reservoir 14. In embodiments, the packer element 28 may be controlled hydraulically, mechanically, and/or by one or more actions of at least one compliant material of the packer element 28. The compliant material may be a class of material that may be adapted for and/or configured to expand when the compliant material may be contacted by a suitable fluid, such as, for example, hydrocarbon in a completion fluid to form a seal. The compliant material of the packer element 28 may be any compliant material capable of expanding when contacting a suitable fluid as known to one of ordinary ski the art.

In embodiments, at least one of the primary and the secondary ports 26a, 26b may be hydraulically isolated from the other ports which may allow for one or more focused sampling configurations. By positioning at least one of the sensors 32 at near and/or adjacent to the primary and secondary ports 26a, 26b, at least one of the first and second components 16, 18, primary and secondary ports 26a, 26b and/or sensors 32 may collect the one or more measurements and/or samplings based on or relating to one or more characteristics associated with (i) the primary and secondary ports 26a, 26b, (ii) fluid flows, flow rates and/or fluid pressures at, near and/or adjacent to the primary and secondary ports 26a, 26b, and/or (iii) the well/reservoir system 12, 14, 30 at, near or adjacent to the primary and secondary ports 26a, 26b. The collected measurements may be transmitted, in real-time, from the sensors 32, transceiver 22 and/or first and second components 16, 18 to a data processing unit, which may be located at the Earth's surface and/or may be utilized by the one or more operators, via, the telemetry system. As a result, the one or more operators may monitor and/or determine, in real-time, one or more conditions at, near and/or adjacent to at least one of the primary and secondary ports 26a, 26b, sensors 32 wall 30 and/or reservoir 14 based on the one or more measurements collected by the sensors 32, and/or second components 18. Alternatively or additionally the collected measurements may be transmitted, in real-time, from the sensors 12, transceiver 22 and/or first and second components 16, 18 to a data processing unit, which may be located within a component of the downhole tool, for example components 16 or 18, and/or may be utilized by the downhole tool in subsequent operations. As a result, the tool may monitor and/or determine, in real-time, one or more conditions at, near and/or adjacent to at least one of the primary and secondary ports 26a, 26b, sensors 32 wall 30 and/or reservoir 14 based on the one or more measurements collected by the sensors 32, and/or second components 18 and determine test and or acquisition parameters by means of algorithms located within the tool.

Real-time monitoring and determining of one or more parameters, such as, for example, fluid flows, flow rates and/or fluid pressures at, near and/or adjacent to at least one of the primary and secondary ports 26a, 26b and/or sensors 32 may be utilized by the one or more operators for monitoring, and/or determining, for example, plugging or leaking of one or more of the primary and secondary ports 26a, 26b. The one or more measurements collected by the sensors 32 and/or second component 18 may be utilized to provide, for example, real-time monitoring and determining of one or more samples for sample assurance.

FIG. 2 illustrates a side view of a system 50 in accordance with the present systems and methods for collecting one or more measurements. The system 50 may include the mandrel 20 and/or transceiver 22 of the first component 16 (shown in FIG. 1) and the second component 18 which may be positioned within the borehole 12 and/or located adjacent to at least a portion of the walls 30 of the reservoir 14. The second component 18 may include the packer element 28 and may have an inlet or port 52 (hereinafter "port 52") which may be formed within the layer 31 of the packer element 28. The port 52 may be, for example, another embodiment of at least one of the primary ports 26a or at least one of the secondary ports 26b.

The system 50 may have one or more sensors 32 and/or a sensor array 54 which may include more than one of the sensors 32. The sensor array 54 and/or sensors 32 ma be positioned and/or located within the port 52 for collecting, logging, indexing and/or storing the one or more measurements associated with the conditions and/or characteristics of the well/reservoir system 12, 14, 30 at, near and/or adjacent to the port 52. The sensor array 54 and/or sensors 32 may receive the wireless signals from the transceiver 22 via the electromagnetic field 23 and may collect the one or more measurements based on the wireless signals received from the transceiver 22. As a result, the sensor array 54 and/or the sensors 32 may be powered electromagnetically, via the wireless signals, to detect and/or collect the one or more measurements. The sensor array 54 and/or sensors 32 may transmit the one or more collected measurements to the transceiver 22 via the electromagnetic field 23.

The system 50 may have flow line 56 which may extend through at least a portion of second component 18, the mandrel 20 and/or packer element 28 and/or into the port 52. One or more isolation valves 58 (hereinafter "the valves 58") may be provided such that access to the flow line 56 may be opened and closed via the valves 58. The valves 58 may be connected and/or coupled to the flow line 56 to control access to the flow line 56 and/or the port 52 by opening and/or closing the valves 58. In an embodiment, valves 58 may be operated in an automatic fashion by the system 50. For example, in D&M operations, mud-pulse telemetry may not allow easy control of tool elements, such as, fir example, valves 58 from the surface. As a result, control of the tool element may have to be implemented downhole. For example, based on the signals received from the sensor array 54 and/or sensors 32, the system 50 may determine and/or decide when and how to consecutively sample fluids from an individual port 52 or a combination of ports as shown in FIG. 3. The one or more operators at the Earth's surface may control the valves 58 such that the flow line 56 and/or the port 52 may be accessible or open when the valves 58 may be located in an open position and may be non-accessible or dosed when the valves 58 may be located in a closed position. When the valves 58 may be located in the open position, the flow line 56 may be accessible or open and the port 52 may be accessible or open such that one or more measurements may be collected by the sensors array 54 and/or the sensor 32. Further, by opening the flow fine 56 and the port 52, one or more samples may be collected by the second component 18 and/or the port 52 and/or the one or more collected samples may be transmitted and/or communicated via the flow line 56.

By controlling the valves 58, the one or more operators may isolate the flow line 56 and/or port 52 depending on the application that the system 50 may have been deployed into the borehole 12 to complete. For example, the sensor array 54 may be configured to collect resistivity measurements within port 50 to determine a location of a gas/liquid contact point within the borehole 12. After determining that the gas/liquid contact point may be at, near or adjacent to the sensor array 54, one of the operators may open the valves 58 and collect a gas or liquid sample via the port 52 and the flow line 56.

In embodiments, one or the operators may set the packer element 28 and begin pumping operation(s) from the primary and secondary ports 26a, 26b as shown in FIG. 1 or from port 52 as shown in FIG. 2. During the pumping operation(s), the sensors 32 and/or may collect and index, for example, pressure measurements from the primary and secondary ports 26a, 26b. The one or more operators may monitor the collected and indexed pressure measurements from each of the primary and secondary ports 26a, 26b. One of the sensors 32 of one of the primary and secondary ports 26a, 26b may collect, for example, a higher pressure measurement which may provide the operator with an indication that plugging or leaking may be occurring at one of the primary and secondary ports 26a, 26b where the higher pressure measurement may have been collected. As a result, the operator may take a course of action to manage, prevent and/or reduce the plugging or leaking based on the collected higher pressure measurement.

FIG. 3 illustrates a downhole tool 120 which may be lowered at an end of the wireline cable 19 into the borehole 12 penetrating the reservoir 14. The downhole tool 120 may have and/or include the first and second components 16, 18. In embodiments, the first and second components 16, 18 may be single packers having the primary and secondary ports 26a, 26b. As shown, the first component 16 may have at least one primary port 26a and at least one secondary port 26b, which may be extended towards, abutting and/or adjacent to at least a portion the walls 30 of the reservoir 14 by inflating the packer element 28 associated with the first component 16. The second component 18 may have at least one primary port 26a and at least one secondary port 26b, which may be extended towards at least a portion of the walls 30 of the reservoir 14 by inflating the packer element 28 associated with the second component 18. Further, the first and second components 16, 18 may include a peripheral recess in fluid communication with the at least one primary ports 26a and/or the at least one secondary ports 26b. Moreover, one or more sensors 32 may be positioned and/or located, at, in and/or adjacent to at least one of the primary and secondary ports 26a, 26b of the first and second components 16, 18 as shown in FIG. 3.

The primary and secondary ports 26a, 26b of the first component 16 may be attached, coupled and/or connected to, for example, a drawdown pump 70 (hereinafter "the pump 70"). The pump 70 of the first component 16 may be utilized and/or activated to provide and/or create one or more flow pulses in the reservoir 14 by pumping fluid from the reservoir 14 into one or more of the primary and secondary ports 26a, 26b of the first component 16. Fluid flows with the borehole 12 and/or the reservoir 14 may be controlled by the one or more flow pulses provided by and/or created by the pump 70. One or more valves 58 of the first component 16 may provide fluid communication between the pump 70 and the primary and secondary ports 26a, 26b via flow lines 64 of the first component 16. In an embodiment, the primary and secondary ports 26a, 26b may be dump chambers which ma be configured to control and or regulate rates of fluid flow into the primary and secondary ports 26a, 26b, respectively. For example, the primary and secondary ports 26a, 26b may be dump chambers having controllable valves which may control and/or regulate rates of fluid flows into the primary and secondary ports 26a, 26b, respectively.

In embodiments, the one or more valves 58 of the first component 16 may be actuated to isolate at least one primary port 26a and the sensor 32 associated with the at least one primary port 26a of the first component 16 or at least one secondary port 26a and the sensor 32 associated with the at least one secondary port 26b of the first component 16. The one or more valves 58 of the first component 16 may be coupled to the at least one primary port 26a of the first component 16 and/or the at least one secondary port 26b of the first component 16.

The primary and secondary ports 26a, 26b of the second component 18 may be attached, coupled and/or connected to a drawdown piston 60 (hereinafter "the piston 60"). The piston 60 may be utilized and/or activated to provide and/or establish a pressure communication between flow lines 64 of the second component 18 and the reservoir 14 by, for example breaching a mudcake 62, as shown in FIG. 2, which may be lining at least a portion of the wall 30 of the borehole 12 and/or may be trapped in one or more of the primary and secondary ports 26a, 26b of the second component 18. One or more valves 58 of the second component 18 may provide fluid communication between the piston 60 and the primary and secondary ports 26a, 26b of the second component 18. The piston 60 may also be utilized, and/or activated to pump fluid from the reservoir 14. As a result, fluid flow within the borehole 12 and/or the reservoir 14 may be controlled by the piston 60.

In embodiments, the one or more valves 58 of the second component 18 may be actuated to isolate at least one primary port 26a and the sensor 32 associated with the at least one primary port 26a of the second component 18 or at least one secondary port 26a and the sensor 32 associated with the at least one secondary port 26b of the second component 18. The one or more valves 58 of the second component 18 may be coupled to the at least one primary port 26a of the second component 18 and/or the at least one secondary port 26b of the second component 18.

A pressure response of the reservoir 14 to one or more flow pulses created and/or provided at primary and secondary ports 26a, 26b of the first component 16 via pump 70 may be determined. The one or more sensors 32 of the first and second components 16, 18 may collect, index, log and/or store, for example, one or more pressure measurements associated with the pressure response of the reservoir 14 to the one or more flow pulses. The one or more collected measurements may be transmitted from the one or more sensors 32 to the transceiver 22, which may be incorporated into the first and second components 16, 18, via the electromagnetic field 23 as shown in FIGS. 1-3. One or more permeability values indicative of the permeability of the reservoir 14 may be determined, calculated and/or obtained by the first and second components 16, 18 based on the one or more pressure measurements collected by the one or more sensors 32 of the first and second components 16, 18. In an embodiment, the downhole tool 120 may selectively activate the primary and secondary ports 26a, 26b to flow and be monitored such that a coarse-grained permeability image of the wall 30 of the borehole 12 may be constructed.

In embodiments, the primary and secondary pons 26a, 26b of the first and second component 16, 18 may be coupled to the piston 60 and the pump 70. Additionally, one or more valves 58 may be may be located between the drawdown pump and piston which may be closed to selectively isolate at least one of the drawdown pump and piston from the primary and secondary ports 26a, 26b. One or more of the primary and secondary ports 26a, 26b of the first and second components 16, 18 may attached, coupled and/or connected to at least one of the drawdown piston and pump via one or more longitudinal flow lines (not shown in the drawings) which may extend along at least a portion of a length of the downhole tool 120.

The primary and secondary ports 26a, 26b of the first and second component 16, 18 may be, for example, circular, rectangular, oval, and/or the like. In embodiments, the primary and secondary ports 26a, 26b of the first and second component 16, 18 may or may not necessarily have a similar or substantially similar shape and or size. For example, the primary and secondary ports 26a, 26b of the first component 18 which may be coupled to the pump 70 and/or may create a flow pulse that may be larger or substantially larger and/or more or substantially more elongated than the primary and secondary ports 26*a*, 26*b* of the second component 18 which may be coupled to the piston 60.

Figure 4:
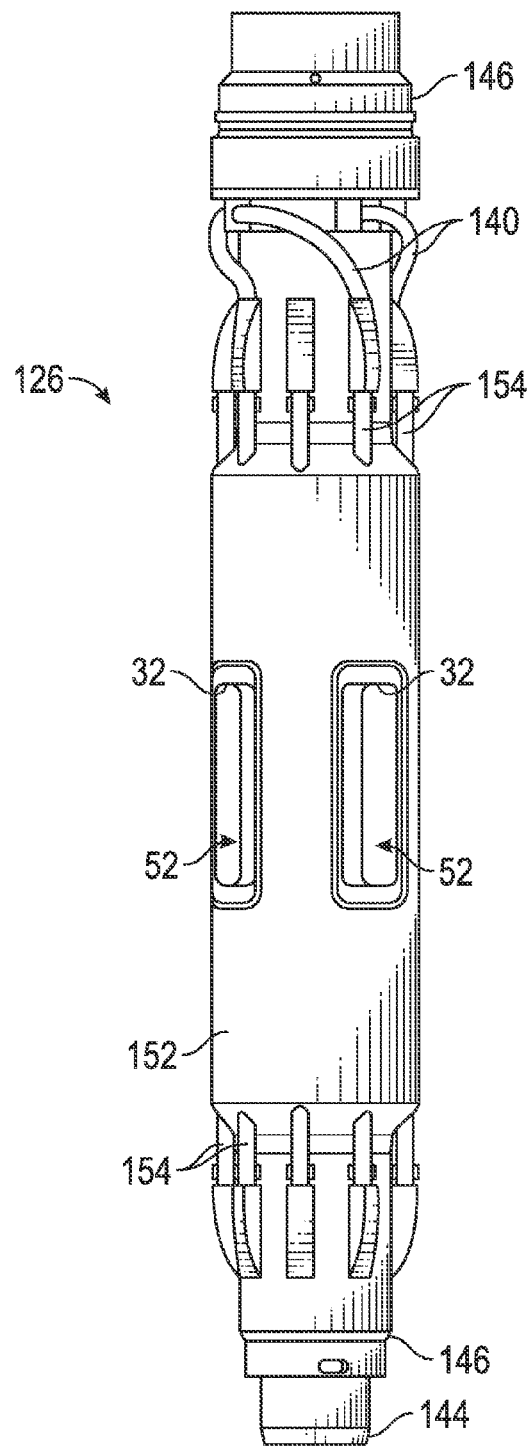
FIG. 4 illustrates a perspective view of a system in accordance with an embodiment.
Figure 5:
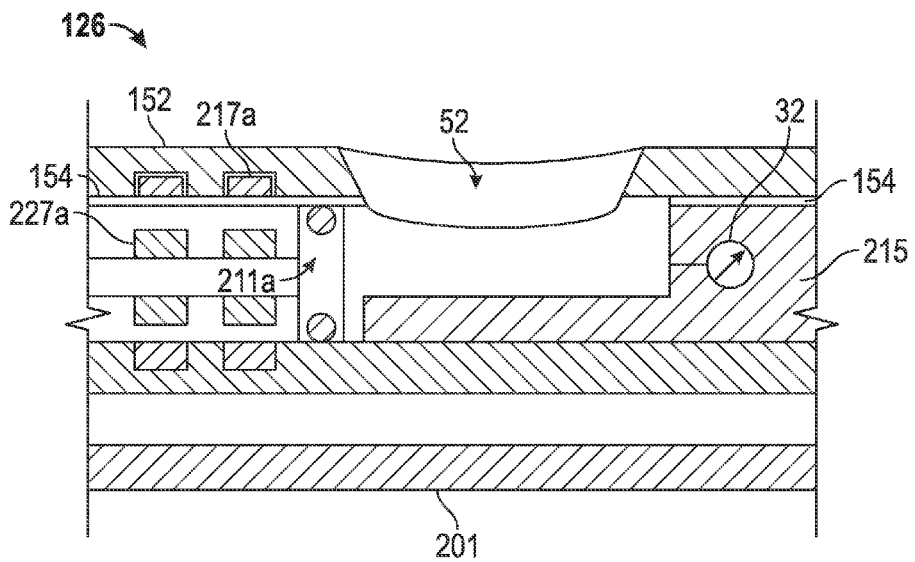
FIG. 5 illustrates a sectional view of the system set forth in FIG. 4 in accordance with an embodiment.

FIG. 4 illustrates a perspective view of a system 126 which may illustrate another embodiment of at least one of the first and second components 16, 18 as shown in FIG. 3. The system 126 may be for example, a single packer having an outer layer 152 which may be expandable to form a seal with at least a portion of the wall 30 of the reservoir 14. An inner inflatable bladder 201, as shown in FIG. 5, may be disposed within an interior of the outer layer 152. The inner inflatable bladder 201 may be inflated and/or deflated by and/or with, for example, a fluid pressurized by a pump via a port in the mandrel 144. Mechanical fittings 146 may be disposed at opposite ends of the outer layer 152, and one of the mechanical fittings 146 may be attached, coupled and/or connected to one or more flow members 140 which may be rotatable and/or pivotable to accommodate expansion of the outer layer 152 by the inner inflatable bladder 201.

The outer layer 152 may have, one or more ports 52 through which fluid may be drawn from at least a portion of the wall 30 of the reservoir 14 when the outer layer 152 ma be expanded to, abutting and/or adjacent to at least the portion of the wall 30 of the reservoir 14, as shown in FIG. 2. The sensor array 54 and/or one or more sensors 32 may be positioned and/or located at in and/or adjacent to the one or more ports 52 of the system 126. The one or more ports 52 may be elongated and embedded radially into the outer layer 152. One or more tubes 154 may be attached, coupled and/or connected to the one or more ports 52 for directing fluid collected from the reservoir 14 to at least one the mechanical fittings 146. The one or more tubes 154 may be at least partially embedded into outer layer 152 and thus move radially outward and radially inward during inflation and deflation of inner inflatable bladder 201.

The one or more flow members 140 may be attached, coupled and/or connected, through a fluid collector, to flow line 64 as shown in FIG. 4. Each of the one or more flow member 140 may define and/or provide a flow path for conducting transferring fluid from the tube 154 to which each of the one or more flow members 140 may be attached, coupled and/or connected. For example, the one or more how members 140 may be hollow and/or may be generally S-shaped and designed for pivotable attachment and/or connection with both the corresponding mechanical fitting 146 and the corresponding tubes 154.

In embodiments the one or more sensors 32 may be provided in the system 126. For example, the one or more sensors 32 may be positioned and/or located in the one or more ports 52, in the tubes 154, or at other flow locations within the system 126. The one or more sensors 32 of the system 126 may be configured to collect the one or more measurements and to wirelessly transmit the one or more collected measurements to the transceiver 22 which may be provided within the system 126 via the electromagnetic field 23 as shown in FIG. 2.

Figure 6:
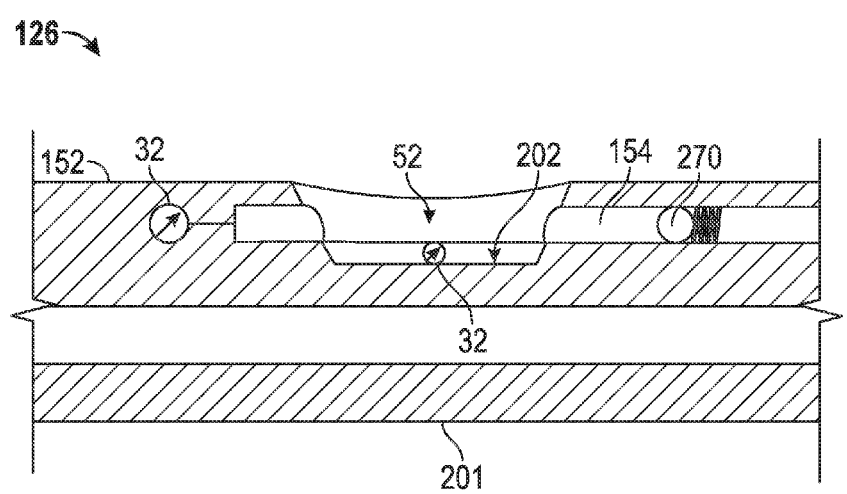
FIG. 6 illustrates a sectional view of the system set forth in FIG. 4 in accordance with an embodiment.

In embodiments, the first and second components 16, 18 and/or the system 126 may provide a smaller or substantially smaller storage volume when compared to storage volumes associated with, for example, straddle or dual packers. A small or substantially smaller storage volume may facilitate and/or expedite testing, such as, for example, low mobility formations. As a result, the first and second components 16, 18 and/or the system 126 may provide advantages for testing, such as, for example, the IPTT test. As shown in FIGS. 5 and 6, storage volumes may be made smaller or substantially smaller with, for example, at least one piston 211*a* which may be integrated into the system 126 (as shown in FIG. 5). To insure port isolation while being capable of flowing, one or more valves 58 may be attached, coupled and/or connected between the port 52 and the pump 70 and/or the piston 60 as shown in FIG. 3.

FIG. 5 illustrates a sectional view of the system 126 as shown in FIG. 4. The one or more tubes 154 may be at least partially embedded in the outer layer 152 which may be extendable toward at least a portion of the wall 30 of the reservoir 14 by inflating the inner inflatable bladder 201. A sensor cartridge 215 may be connected, attached, disposed and/or located at an end of the tube 154. The sensor cartridge 215 may provide and/or include the one or more sensors 32 which may in embodiments, be in pressure communication with the port 52 of the system 126. As a result, the one or more sensors 32 may be coupled to the port 52. The one or more sensors 32 may be in communication with the transceiver 22 and/or other electronics which may be incorporated into and/or provided by the system 126 via the wireless signals that may be transmittable over the electromagnetic field 23 as shown in FIG. 2. In embodiments, the one or more sensors 32 may be in communication with the electronics of the system 126 via or a wired connection. Moreover, the one or more measurements collected by one or more sensors 32 may also be stored in a memory chip not shown in the drawings) of the sensor cartridge 215. In one example the sensor cartridge 215 may be implemented with, for example, a smart plug as described in U.S. Pat. No. 6,234,257 which is incorporated herein in its entirety.

A pretest piston 211*a* may also be provided, located and/or disposed in, at and/or adjacent to the tube 154. Further, the pretest piston 211*a* may be coupled to and/or integrated into the port 52 as shown in FIG. 5. One or more positions of the pretest piston 211*a* may be accurately determined and/or controlled by, for example, one or more permanent magnets 227*a* and/or coils or Hall Effect sensors 217*a*. The coils 217*a* may be electrically driven and cooperate with the one or more permanent magnets 227*a* to form a linear motor configured to drive the pretest piston 211*a*. While the pretest piston 211*a* may be a drawdown piston, other types of pumping mechanisms may additionally be provided, located and/or disposed in, at and/or adjacent to the tube 154 and/or integrated into the port 52.

FIG. 6 is a sectional view of the system 126 as shown in FIG. 4. The one or more tubes 154 may be at least partially embedded in the outer layer 152 which may be extendable toward at least a portion of the wall 30 of the reservoir 14 by inflating the inner inflatable bladder 201. A passive valve 270 may be utilized and/or provided to isolate the pressure variations occurring in the port 52 from the pressure variations occurring in at least a portion of the tube 154 and the system 126. The passive valve 270 may be integrated into and/or coupled to the port 52. The passive valve 270 may be configured to isolate the pressure variations occurring in the port 52, at least when pressure in at least a portion of the tube 154 may be higher. For example during testing of an overbalanced well, pressure in the port 52 may be below formation pressure and/or wellbore pressure. In embodiments, the passive valve 270 may be a check valve of spring loaded type or of shuttle type. The passive valve 270 may be configured and/or adapted to permit fluid to be drawn from the wall 30 of the reservoir 14. In embodiments, the passive valve 270 may be easier or substantially easier to package than an active valve which may utilize electrical or hydraulic power, and/or electronics. The one or more sensors 32 may be in communication with the port 52 to collect the one or more measurements at the port 52 which may be transmitted by wireless signals to the transceiver 22 and/or electronics of the system 126 over the electromagnetic field 23 as shown in FIG. 2.

In embodiments, the one or mores sensors 32 shown in FIG. 6 may be provided and/or located within or on top of a sealing layer 202. For example, at least one of the sensors 32 may be located within the sealing layer 202 which may be a pressure sensitive skin located and/or position at, within and/or adjacent to the port 52. In embodiments, the sealing layer 202 may be affixed, disposed, attached and/or connected to at least a portion of the first component 16 and/or the second component 18. The sealing layer 202 may be disposed at least partially flush with the port 52. The sealing layer 202 may have conductive layers separated by a compressible dielectric material, which may result in capacitance variation as a result of pressure change which may occur at, in and/or adjacent to the port 52.

Figure 7:
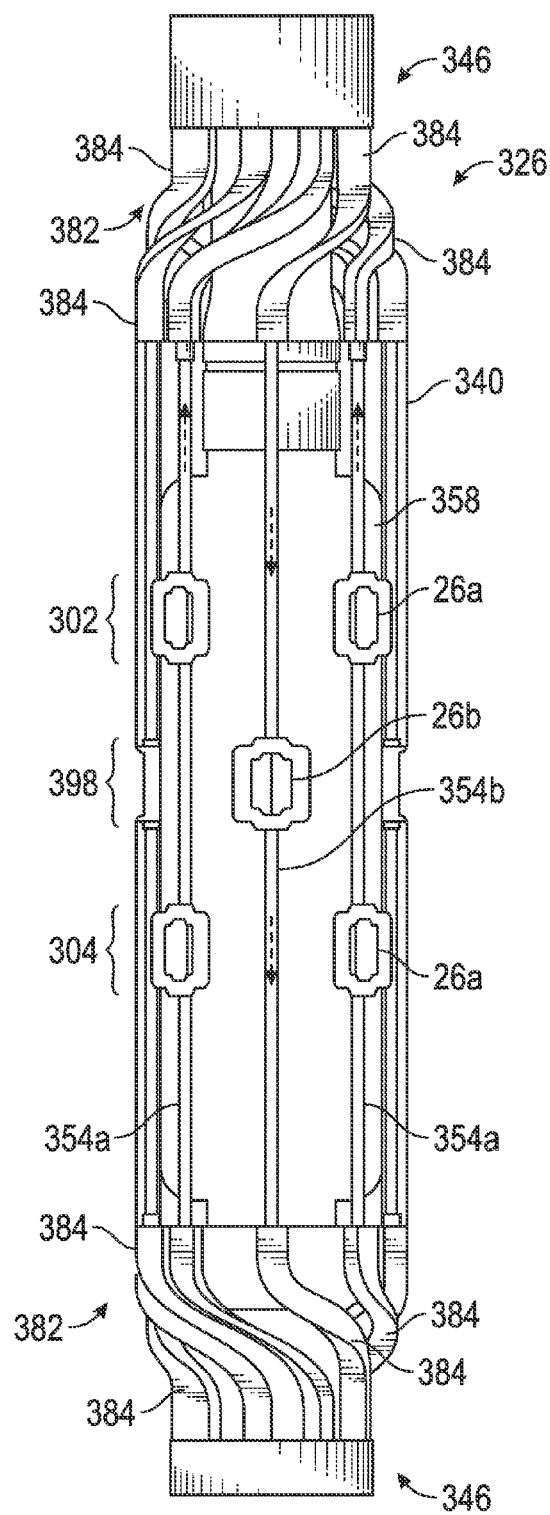
FIG. 7 illustrates a partial cut away view of a system in accordance with an embodiment.
Figure 8:
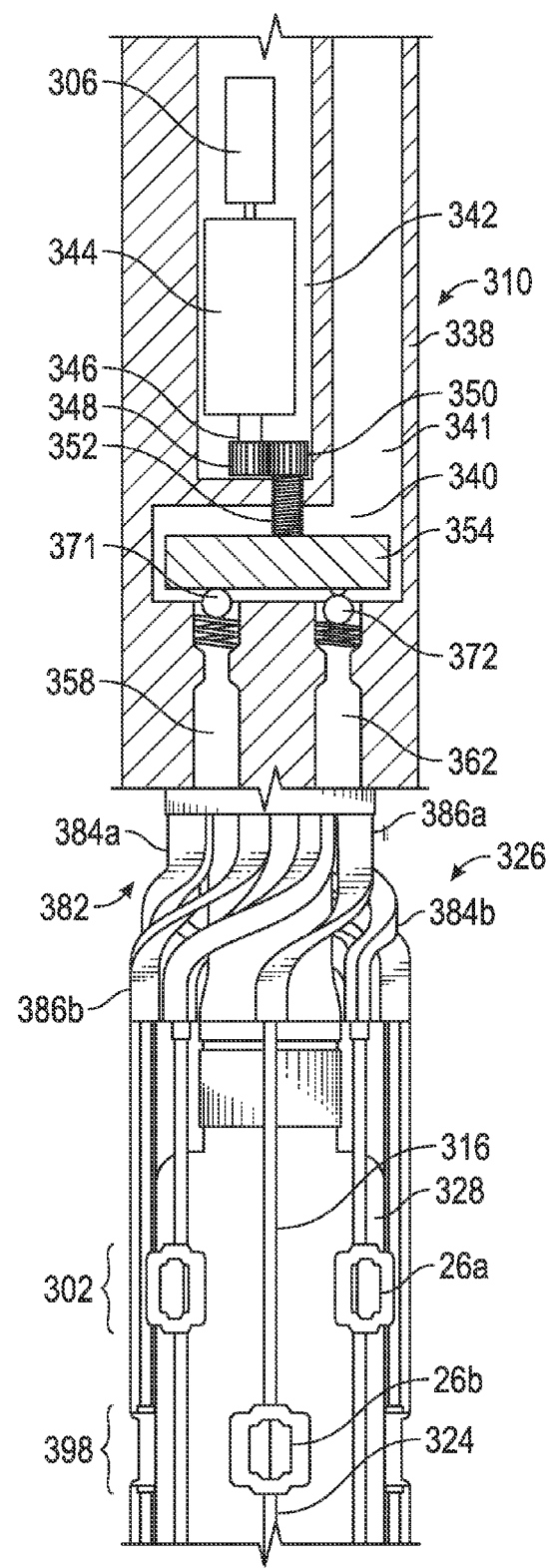
FIG. 8 illustrates a schematic view of the system set forth in FIG. 7 connected to a fluid collector in accordance with an embodiment.

FIG. 7 illustrates a system 326, which may be another embodiment of at least one of the first and second component 16, 18 as shown in FIG. 1, exhibiting primary and secondary ports 26a, 26b. For example, the system 346 may be a single packer having the primary and secondary ports 26a, 26b and/or may provide isolation between one or more of the primary and secondary ports 26a, 26b. As a result, the primary and secondary ports 26a, 26b of the system 326 may provide and/or may be utilized as an array of ports. A single piston may be coupled to a rotating distribution valve, such as, for example, a rotating distribution valve or rotary indexer 354 as shown in FIG. 8, which may be configured and/or adapted to utilize one or more of the primary and secondary ports 26a, 26b as successive sink ports. In embodiments, the rotating distribution valve may be one of the valves 58 which may be attached, connected and/or coupled to the primary and secondary ports such that one or more of the primary and secondary ports 26a, 26b may be utilized as successive sink ports.

The primly and secondary ports 26a, 26b may be provided, positioned and/or located on the system 326 as the pressure sink port/ring, which may be located closer or substantially closer to a pressure sink port in the axial direction as formerly possible. Raving closely spaced primary and secondary ports 26a, 26b, characterization of permeability variation of the reservoir 14 close to or substantially close to the system 326 may be determined, estimated and/or obtained based on the one or more measurements collected by the sensors 32 which may be located at, in or adjacent to the primary and secondary ports 26a, 26b. For example, local variations of the permeability of the reservoir 14 due to intrinsic rock heterogeneities and/or particle infiltration or rock damage that may occur in the borehole 12 may be characterized near or substantially near the system 326 by the one or more measurements collected by the sensors 32.

Further, utilizing the primary and secondary ports 26a, 26b as successive pressure sink ports, an image of formation permeability may be obtained based on the one or more measurements collected by the sensors 32 of the system 326. By successively using one of the primary and secondary ports 26a, 26b as a sink port, and one or more other ports of the primary and second ports 26a, 26b as observation port points, multiple flow patterns may be generated based on the one or more measurements collected by the one or more sensors 326. For example, pressure traces measured at the observation ports following a drawdown at one or more of the sink port can be jointly inverted, and formation anisotropy directions as well as formation heterogeneity, which may include formation fractures, may be estimated, determined and/or calculated near or substantially near the system 326. Measurements from two observation ports may not be sufficient to distinguish heterogeneities in the formation, such as, for example, distinguishing local changes of the permeability from anisotropy and/or distinguishing a difference of flow behavior in one direction compared to another direction over an extended region from the presence of formation fractures.

The system 326, as shown in FIG. 7, has an outer layer 340 that is expandable to form a seal with at least a portion of the walls 30 of the reservoir 14 which may be surrounding the system 326. An inner inflatable bladder 3 may be located, positioned and/or disposed within an interior of the outer layer 340. The inner bladder 358 may be inflated and deflated by a fluid pressurized with a pump (not shown in the drawings) which may be incorporated into the system 326. Mechanical fittings 346 may be located, positioned and/or disposed at opposite ends 382 of the outer layer 340 and/or may have a plurality of pivotable flow members 384 which may be configured to accommodate expansion of the outer layer 340 by the inflatable bladder 358.

The outer layer 340 may have the primary and secondary ports 26a, 26b through which fluid may be drawn and/or collected from the reservoir 14 when the outer layer 340 is expanded against the wall 30 of the reservoir 14. The one or more sensors 32 may be located, positioned and/or provide at, in and/or adjacent to the primary and secondary ports 26a, 26b of the system 326. The primary and secondary ports 26a, 26b may be embedded radially into the outer layer 340. A plurality of tubes 354a, 354b may be attached, coupled and/or connected to the primary and secondary ports 350a, 350b, respectively, for directing fluid drawn and/or collected from the reservoir 14 to at least one or both of the mechanical fittings 346. The tubes 354a, 354b may be at least partially embedded in the outer layer 340 and thus may move radially outward and/or radially inward during inflation and deflation of inflatable bladder 358. For example, alternating tubes 354a may be attached, coupled and/or connected to two primary ports 26a located in axially outlying intervals 302 and 304, of the system 326 and/or which may be isolated from each other. Alternating tubes 354b may be attached, coupled and/or connected to individual central port 350b located in central interval 398 of the system 326.

Pivotable flow members 384 may be located, positioned and/or provided at each mechanical fitting 346 and/or may be coupled though a fluid collector 310, as shown in FIG. 8, to flow lines (not shown in the drawings) in the system 326. Each pivotable flow member 384 may be, for example, hollow and/or may define a flow path for conducting fluid from the tube 354a and/or 354b to which each pivotable flow member 384 may be connected. The pivotable flow members 384 may be, for example, generally S-shaped and designed for pivotable connection with both the corresponding mechanical fitting 346 and the corresponding tubes 354a, 354b.

FIG. 8 illustrates the system 326, as shown in FIG. 7, which may have a plurality of pivotable flow members 384a, 384b, 386a, 386b which may be disposed, for example, at an upper end 382 of the single packer. The fluid collector 310 may be attached, connected and/or coupled to the system 326. Further, the fluid collector 310 may have a plurality of distribution flow lines 358, 362 which each may be attached, coupled and/or connected to one of the plurality of pivotable flow members 384a, 384b, 386a, 386b. For example, four distribution flow lines may be attached, coupled and/or connected to four primary ports 26a which may be located in the central interval 398. Thus, the distribution flow line 362 may be, for example, attached, coupled and/or connected to one of the pivotable flow members 386a, 286b, and the distribution flow line 358 may be, for example, attached, coupled and/or connected to a pivotable flow member (not shown in the drawings) diametrically opposite to one of the pivotable flow members 384a, 384b. Similarly, other distribution flow lines (not shown in the drawings) may be attached, coupled and/or connected to one of the pivotable flow members 384a, 384b. In embodiments, some pivotable flow members, such as, for example, pivotable flow members 384b, 386b, may not be coupled to the fluid collector 310.

The fluid collector 310 comprises a distribution chamber 340 that may be attached, coupled and/or coupled to a flow line 341. The flow line 341 may extend in the system 326, for example, to be in fluid communication with the pump 70 and/or piston 60 which may be provided and/or incorporated into the system 326. The rotary indexer 354 may be located, positioned and/or disposed in the chamber 340 and/or may be configured to selectively actuate valve members, such as, for example, valve members 371, 372, such that the flow line 341 may be selectively coupled to at least one of the primary and secondary ports 26a, 26b of the system 326. As shown in FIG. 8, the flow line 341 may be attached, coupled and/or connected to secondary port 26b located in central interval 398 of the system 326 via one of the pivotable flow members 386a, 386b and/or a tube 324 coupled to the secondary port 26b.

The rotary indexer 354 may be moved, rotated and/or actuated by a shaft 352 coupled to a series of gears 348, 350. In embodiments, the rotary indexer 353 may be driven by a linear actuator not shown in the drawings) or may be a solenoid valve system. The gears 348, 350 may be moved and/or actuated by an electric motor 344 via a shaft 346. The electrical motor 344 may power and/or energized by a driver 306, coupled to an electrical power source (not shown in the drawings).

In operation, the pump 70 and/or the piston 60 which may be provided in the system 326 may be utilized and/or actuated to successively draw fluid from the secondary port 26b, as illustrated by upward arrow 316. The rotary index 354 may be configured to close the valve members, such as, for example, the sake members 371, 372 when for example, in an intermediate position between a first position in which a first valve member 371 may be open and a second position in which a second valve member 372 different from the first valve member 371 may be open. The rotary index 354 may also be configured to open the valve members, such as, for example, the valve members 371, 372 when in, for example, an angular position.

Figures 9, 10:
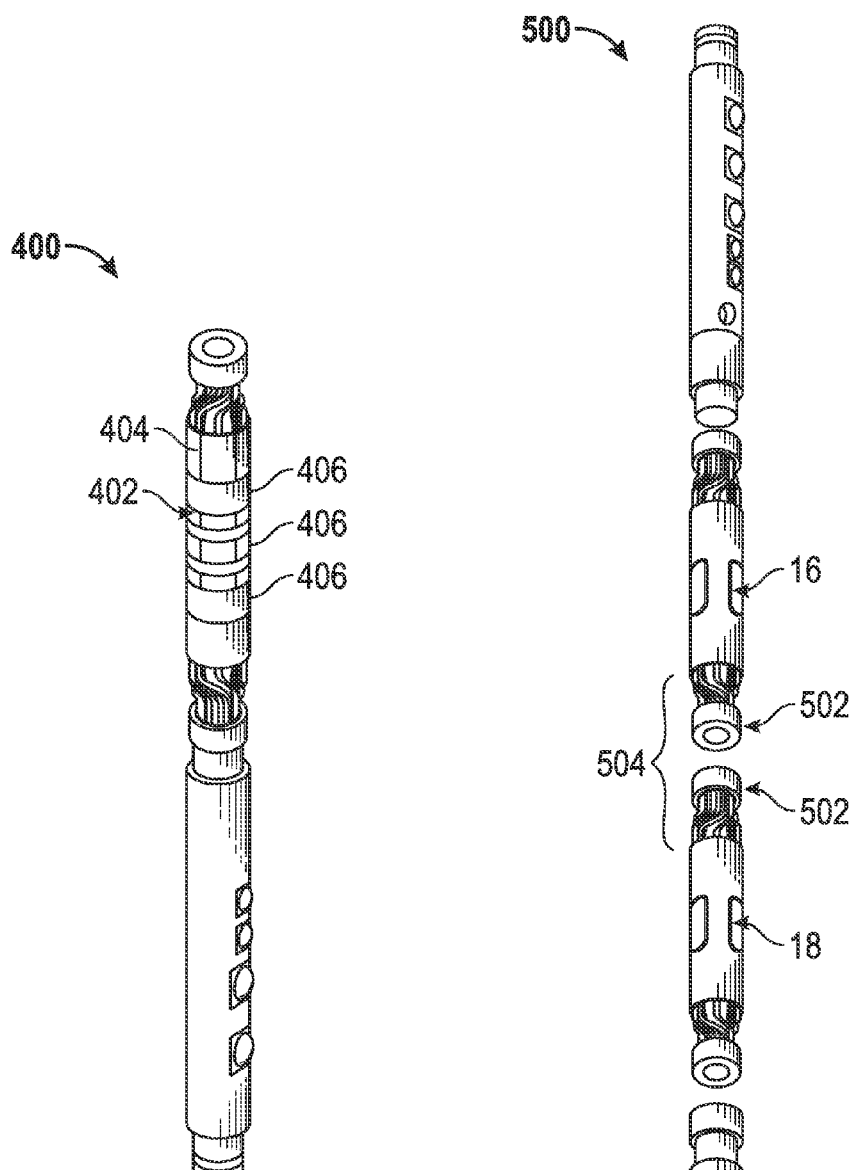
FIG. 9 illustrates a perspective view of a downhole tool in accordance with an embodiment.
FIG. 10 illustrates an exploded perspective view of a downhole tool in accordance with an embodiment.

FIG. 9 is a perspective view of a system 400 illustrating another embodiment of the first and second components 16, 18 as shown in FIG. 3 and the system 326 as shown in FIG. 7. The system 400 may have the primary and second ports 26a, 26b, as shown in FIGS. 3 and 7, which may be fluidly coupled to a recessed ring 402 which may be spanning a perimeter of an outer layer 404 of the system 400. One or more sensors 32 may be located, positioned and/or provided in, at and/or adjacent to the one or more of the primary and secondary ports 26a, 26b. One or more ring sink ports 406 may be provided at, on and/or adjacent to the outer layer 404 of the system 400. The one or more ring sink ports 406 may be utilized, and/or actuated to generate, for example, a pressure disturbance in the reservoir 14. The one or more sensors 32 may collect one or more measurements associated with the pressure disturbance in the reservoir 14 which may have been generated by the one or more ring sink ports 406. The one or more measurements collected by the one or more sensors 32 may be wirelessly transmitted to the transceiver 22 which may be provided and/or incorporated into the system 400 via the electromagnetic field 23.

FIG. 10 illustrates an exploded view of a downhole tool 500 which may be another embodiment downhole tool 120 as shown in FIG. 3. The downhole tool 500 may be, for example, a formation testing tool and/or may have the first and second components 16, 18. In embodiments, the first and second components 16, 18 may be single packers which may have the primary and secondary ports 26a, 26b as shown in FIG. 3. The one or more sensors 32 may be located, positioned and/or provided at, in and/or adjacent to the primary and secondary ports 26a, 26b of the first and second components 16, 18 of the downhole tool 500. The one or more sensors 32 may transmit one or more collected measurements to the transceiver 22 which may be provided by and/or incorporated into the downhole tool 500 via the electromagnetic field 23.

Using one or more extendible and/or movable spacers 502 (hereinafter "the spacers 502"), spacing 504 between the first and second components 16, 18 may be adjusted to a thickness of the reservoir 14 to be tested and/or a depth at which fluid flow in the reservoir 14 may be monitored. The spacers 502 may be configured to be of variable lengths, and the spacing 504 between the first and second components 16, 18 may be adjusted downhole, when, for example, the downhole tool 500 may be lowered in the borehole 12. For correct interpretation, the spacing 504 between the first and second components 16, 18 may be known and/or may be measured in instances when the first and second components 16, 18 may have variable lengths. The pump 70 may be provided by, incorporated into and/or connected to the first component 16 of the downhole tool 500 as shown in FIG. 3. In embodiments, the pump 70 of the downhole tool 500 may be utilized and/or actuated to generate a flow pulse in the reservoir 14. The flow pulse may be of a larger magnitude because pressures in the borehole 12 which ma be below and above the first component 16 may be balanced, and a drawdown pressure may not be limited by a resulting force which may be applied on the second component 18 of the downhole tool 500. Also, the primary and secondary ports 26a, 26b of the first component 16 may be larger sized ports. As a result, resistance to fluid extraction by the pump 70 may be reduced based on the lamer sized ports. Moreover, the pump 70 may be relatively less limited by the power made available from the first component 16 based on the larger sized ports.

In embodiments, the first component 16 may provide and/or have the passive valve 270 and/or the sensor 32 at near and/or adjacent to or coupled to the port 52, which may be provided by the first component 16, as shown, for example, in FIG. 4. In embodiments, the first component 16 may provide the rotary indexer 354, as shown, for example, in FIG. 8. As a result, the pressure responses, such as, for example, the pressure buildup which may result from a flow pulse generated at the first component 16 may be independently monitored and/or may be utilized to invert a formation flow model which may have at least some level of anisotropy.

The second component 18 may provide and/or have the pretest piston 211a, as shown in FIG. 5, which may be utilized to breach the mudcake 62 of the reservoir 14 as shown in FIG. 2. In embodiments, the pretest piston 211a may be utilized to provide at least a relatively faster equilibrium between pressure at the primary and secondary port 26a, 26b of the second component 18 and pressure in the reservoir 14 adjacent to or substantially adjacent to the primary and secondary ports 26a, 26b of the second component 18 than systems having a port/flow line with a larger or substantially larger volume.

Figure 11:
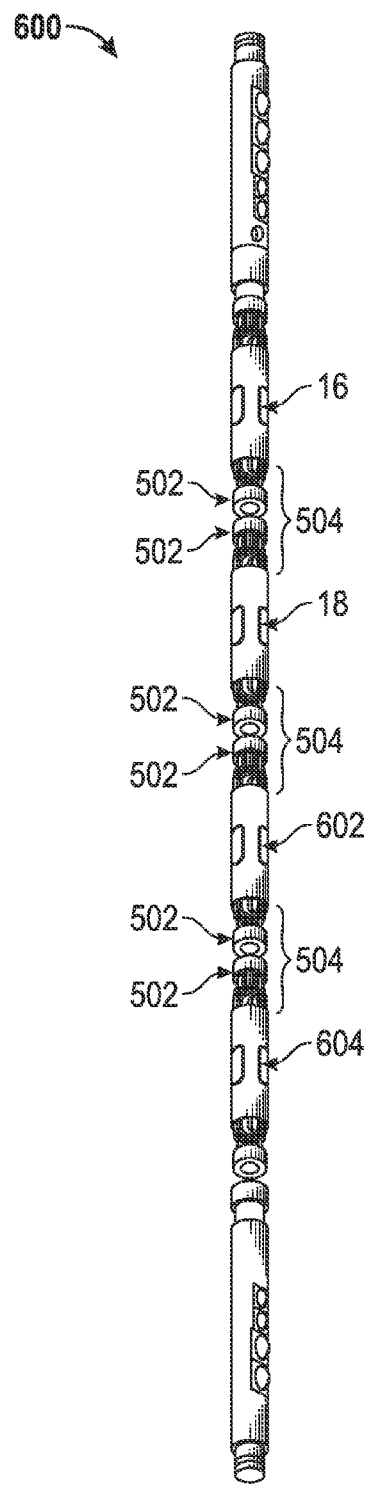
FIG. 11 illustrates an exploded perspective view of a downhole tool in accordance with an embodiment.

FIG. 11 illustrates an exploded view of a downhole tool 600 which may be another embodiment of the downhole tool 500 as shown in FIG. 10. The downhole tool 600 may have the first and second components 16, 18, a third downhole component 602 and/or a fourth downhole component 604. In embodiments, the first and second components 16, 18, the third downhole component 602 and/or the fourth downhole component 604 (collectively known hereinafter as "the first, second third and fourth components 16, 18, 602, 604") may be single packers having the primary and secondary ports 26a, 26b and/or the one or more sensors 32 which may be located, positioned and/or provided at, in and/or adjacent to the primary and secondary ports 26a, 26b as shown in FIG. 3. The one or more sensors 32 of the first, second, third and fourth components 16, 18, 602, 604 may wirelessly transmit one or more collected measurements to the transceiver 22 which may be provided by and/or incorporated into the downhole tool 600 via the electromagnetic field 23.

In embodiments, the primary and secondary ports 26a, 26b and/or the first, second, third and fourth components 16, 18, 602, 604 may be configured and/or adapted to provide one or more sink probes and/or one or more observation probes. One or more spacers 502 may be located and/or positioned between the first, second third and fourth components 16, 18, 602, 604 as shown in FIG. 11. As a result, multiple spacings 504 may be provided between the first, second third and fourth components 16, 18, 602, 604. Further, the multiple spacings 504 may be provided between one or more sink probes and/or one or more observation probes which may be achievable by utilizing a single tool string having the downhole tool 600. Moreover, multiple flow patterns may be generated in the reservoir 14 by the first, second third and fourth components 16, 18, 602, 604 of the downhole tool 600.

In embodiments, the primary and secondary ports 26a, 26b in the second component 18 and the third component 602 may be utilized as sink and observations ports, and pressure measurements collected by the sensors 32 may be used to determine a first permeability value of the reservoir 14 in front of, adjacent to or substantially adjacent to the second component 18 and the third component 602. The primary and secondary ports of the first component 16 and the forth component 604 may be utilized as sink and observations ports, and pressure measurements collected by the sensors 32 may be utilized to determine a second permeability value of the reservoir 14 in front of adjacent to or substantially adjacent to the second component 18 and/or the third component 602. If available, the second permeability value may be corrected for near or adjacent borehole effects with measurements collected and/or performed using the primary and secondary ports 26a, 26b of the third component 602 and/or the forth component 604 as sink and observations ports, as well as measurements collected and/or performed using the primary and secondary ports 26a, 26b in the first and second components 16, 18 as sink and observations ports. Further, a flow pulse may be generated simultaneously at the first, second, third and fourth components 16, 18, 602, 604, and the pressure response, such as, for example, pressure buildup, may be measured also at the first and second components 16, 18. The pressure measurements collected by the sensors 32 may be utilized to determine a third permeability value of the reservoir 14 in front of or adjacent to the second component 18 and/or the third component 602. The first value of the permeability may be representative of a zone of the reservoir 14 that may be shallower than the zone of the reservoir 14 which may be represented by the second value of permeability. The third value of the permeability may be representative of the horizontal permeability of the reservoir 14, while the first and second values of permeability may be at least relatively more affected by the vertical permeability of the reservoir 14. The horizontal and vertical permeabilities of the reservoir 14 may be determined based on one or more of the first, second and third permeability values for the reservoir 14. Moreover, formation pressures determined from the buildups conducted at the primary and secondary ports 26a, 26b, in the first component 16, the second component 18, the third component 602 and/or the fourth component 604 components may be analysed to deliver an in-situ formation fluid density and/or to determine whether the portions of the formation in which the four components are set are in communication.

Figure 12:
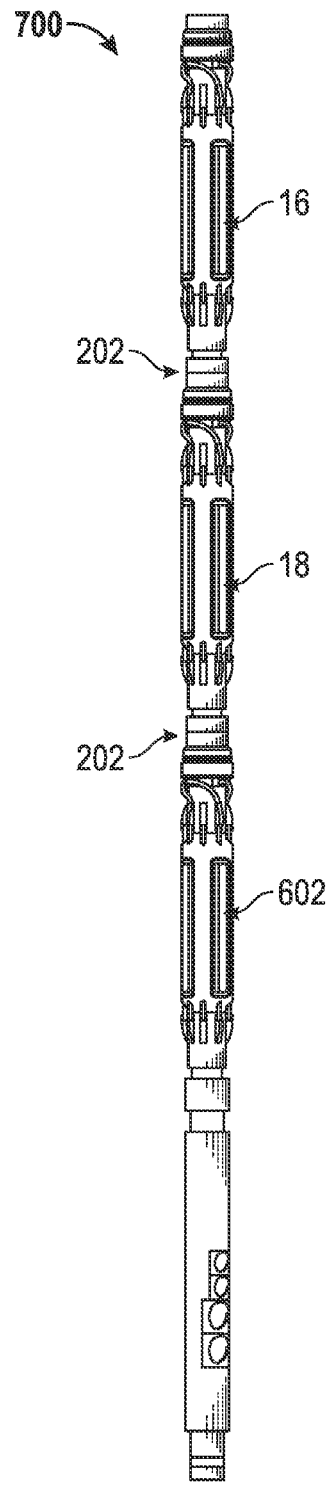
FIG. 12 illustrates an exploded perspective view of a downhole tool in accordance with an embodiment.

FIG. 12 illustrates an exploded view of a downhole tool 700 which may be another embodiment of the downhole tool 500 as shown in FIG. 10. In an embodiment, the downhole tool 700 may be a downhole formation testing tool. The downhole tool 700 may have and/or incorporate the first and second components 16, 18 and/or the third downhole component 602 (collectively known hereinafter as "the first, second and third components 16, 18, 602") which may be single packers having the primary and secondary ports 26a, 26b and/or the one or more sensors 32 which may be located, positioned and/or provided at, in and/or adjacent to the primary and secondary ports 26a, 26b as shown in FIG. 3. The one or more sensors 32 of the first, second, and third components 16, 18, 602 may wirelessly transmit one or more collected measurements to the transceiver 22 which may be provided by and/or incorporated into the downhole tool 700 via the electromagnetic field 23.

In embodiments, a flow pulse may be generated in the reservoir 14 by simultaneously utilizing the primary and secondary ports 26a, 26b of at least two of the first, second, and third components 16, 18, 602 or of the first, second, and third components 16, 18, 602. As a result, a flow pattern closer to and/or substantially similar to a radial flow may be generated in the reservoir 14 that may be thicker or substantially thicker than a height of one of the first, second, and third components 16, 18, 602. The pressure response, such as, for example, a buildup may be measured using, one or more of the sensors 32 of the first, second, and third components 16, 18, 602 which may be in an isolated communication with the primary and secondary ports 26a, 26b of the first, second, and third components 16, 18, 602.

One or more of the sealing layers 202, as shown in FIG. 6, may be positioned between and/or may join one or more of the first, second, and third components 16, 18, 602 as shown in FIG. 12. The one or more sealing layers 202 may be extendable towards the wall 30 of the reservoir 14 when the bladder 201 which may be provided by and/or incorporated into the first, second, and third components 16, 18, 602 may be inflated and/or expanded. As a result, the one or more sealing layers 202 may provide and/or create a proper seal between at least a portion of the wall 30 of the reservoir 14 and the primary and secondary ports 26a, 26b of the first, second, and third components 16, 18, 602. The proper seal provide and or created by the one or more sealing layer 202 may be utilized when the reservoir 14 may have low permeability and/or when the borehole 12 may have the mudcake 62 which may exhibit poor sealing, efficiency with respect to the packer element 28 of the first, second, and third components 16, 18, 602. Moreover, one or more of the sensors 32 may be located within or on top of the one or more sealing layers 202 for collecting the one or more measurements at, near and/or adjacent to the one or more sealing layer 202.

Figure 13:
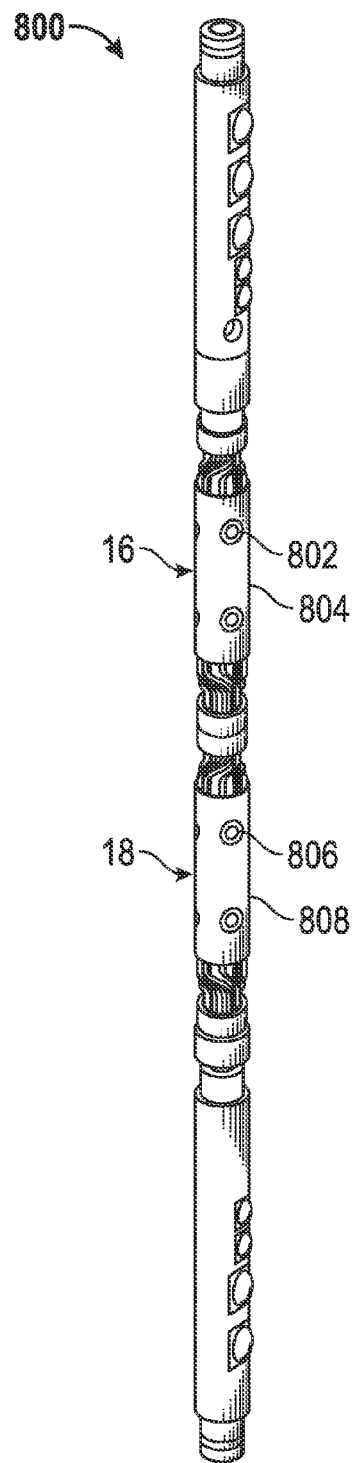
FIG. 13 illustrates an exploded perspective view of a downhole tool in accordance with an embodiment.

FIG. 13 illustrates an exploded view of a downhole tool 800 which may be another embodiment of the downhole tool 120 shown in FIG. 3. The downhole tool 800 may have and/or may incorporate the first and second components 16, 18 which may be single packers. Each of the first and second components 16, 18 may have at least two rows of the primary and secondary ports 26a, 26b. For example, the first component 16 may have a first row 802 of the primary and secondary ports 26a, 26b and/or a second row 804 of the primary and secondary ports 26*a*, 26*b*. Further, the second component. 18 may have a first row 806 of the primary and secondary ports 26*a*, 26*b* and/or a second row 808 of the primary and secondary ports 26*a*, 26*b*. The first and second components 16, 18 may have and/or may incorporate the one or more sensors 32 which may be located, positioned and/or provided at, in and/or adjacent to the primary and secondary ports 26*a*, 26*b* of the first and second components 16, 18 as shown in FIG. 3. The one or more sensors 32 of the first and second components 16, 18 may wirelessly transmit one or more collected measurements to the transceiver 22 which may be provided by and/or incorporated into the downhole tool 800 via the electromagnetic field 23.

In embodiments, first row 806 of the primary and secondary ports 26*a*, 26*b* of the second component 18 may be utilized as sink ports and a pressure response of the reservoir 14 may be measured at short or substantially short spacings by collecting one or more pressure short spacing measurements with the sensors 32 of the second row 808 of the primary and secondary ports 26*a*, 26*b* of the second component 18 and/or utilizing the second row 808 of the primary and secondary ports 26*a*, 26*b* of the second component 18 as observation ports. Additionally, at long or substantially long spacings, the sensors 32 of the primary and secondary ports 26*a*, 26*b* of the first component 16 may collect one or more long spacing measurements associated with the pressure response and/or the first row 802 and/or the second row 804 of the primary and secondary ports 26*a*, 26*b* of the first component 16 may be utilized as observation ports.

In embodiments, one of the first row 802 or second row 804 of the primary and secondary ports 26*a*, 26*b* of the first component 16 may be utilized as a sink port. A pressure response of the reservoir 14 may be measured by one or more measurements collected by the sensors 32 at short or substantially short spacing by utilizing the other row of primary and secondary ports 26*a*, 26*b* of the first component 16 as observation ports and/or collecting the one or more short spacing measurements with the sensors 32 of the other row of primary and secondary ports 26*a*, 26*b* of the first component 16. Moreover, pressure response of the reservoir 14 may be measured at long spacings by utilizing the primary and secondary ports 26*a*, 26*b* of the second component 18 as observation ports and/or collecting the one or more long spacing measurements associated with the pressure response via one or more of the sensors 32 of the second component 18.

The one or more short spacing measurements collected by the one or more sensors 32 may be utilized to, for example, determine values of the formation permeability at, near and/or adjacent to the borehole 12 in front of and/or adjacent to the first and second components 16, 18. The one or more long spacing measurements collected by the one or more sensors 32 may be corrected for near or adjacent borehole effects which may have been determined previously one or more corrected long spacing measurements may be utilized to calculate, determine and/or obtain values of the permeability of the reservoir away from or substantially away from the borehole 12 and/or between the first and the second components 16, 18. As a result, an image of the formation permeability of the reservoir 14 may be determined and/or obtained in situ based on the one or more short spacing measurements and/or the one or more long spacing measurements collected by the one or more sensors 32 of the first and second components 16, 18 of the downhole tool 800. For example, damage zone permeability (actually mobility), permeability anisotropy and/or undamaged formation mobility may be determined and/or obtained based on the one or more short spacing measurements and/or the one or more long spacing measurements.

The values of the formation permeability of reservoir 14 which may be determined, measured and/or obtained in situ near the borehole 12 may be analyzed to estimate a local variability of the formation permeability of the reservoir 14 and/or a bias of the local mean relative to the value of the formation permeability deeper into the reservoir 14.

Permeability values measured, for example, in laboratory on sidewall core samples may be representative of the formation permeability in a localized zone near the borehole 12. The local variability and the bias of the local mean may be utilized to interpret permeabilities values measured on sidewall core samples from, for example, a same well or in a same formation. A confidence that the permeability measured on a particular core sample may be representative of the reservoir 14 at a larger scale which may be determined from the local variability and/or the bias of the local mean. Further, by utilizing the local variability and/or the bias of the local mean which may be measured in situ, a coring program in the same well and/or in the same formation may be designed and/or aimed at collecting enough core so that an average value of the permeability measured over a subset of core samples may be representative.

The image of the formation permeability of the reservoir 14 determined and/or obtained with short and long spacing interference testing may be utilized to identify, for example, fracture directions and direction changes of a fracture away from the borehole 12. For example, a flow model having a fracture ma be inverted using interference testing measurements, borehole resistivity images and/or other images. From the inversion, natural fractures may be located and/or permeability of the natural fractures may be estimated. The estimated permeability of the natural fractures may be, for example, utilized for design of frac pack jobs to avoid losing fracturing fluid in already existing fractures, and/or to avoid creating fractures which may rapidly join one or more existing fractures.

Figure 14:
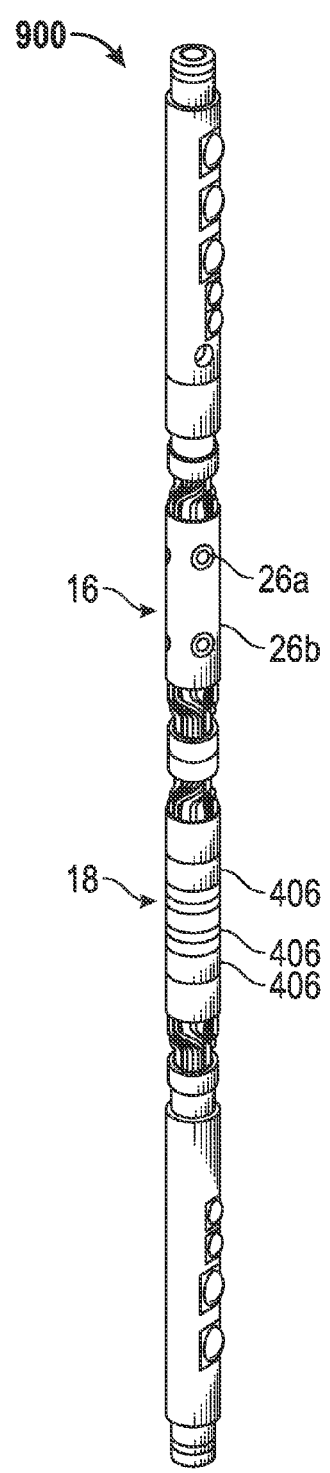
FIG. 14 illustrates an exploded perspective view of a downhole tool in accordance with an embodiment.
Figure 15:
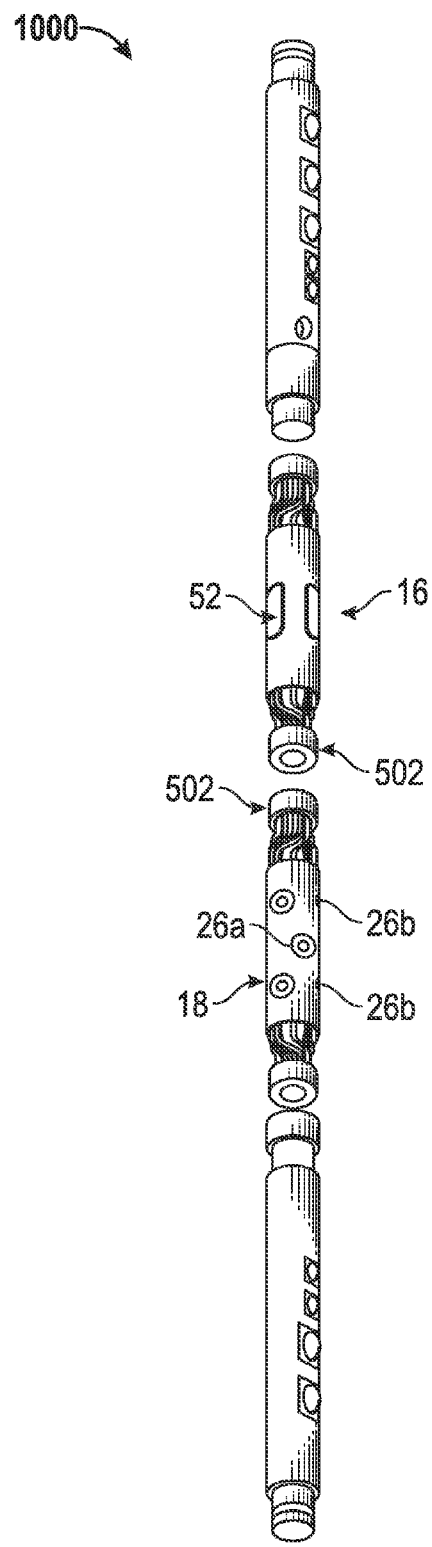
FIG. 15 illustrates an exploded perspective view of a downhole tool in accordance with an embodiment.

FIGS. 14 and 15 illustrate additional configurations of downhole tool 900 and/or downhole tool 1000 (collectively known hereinafter as "downhole tools 900, 1000"), respectfully, which may generate and/or create one or more flow pulses by the second component 18. The downhole tools 900, 1000 may be illustrates of another embodiment of the downhole tool 120 as shown in FIG. 3 which may provide and/or incorporate the first and second components 16, 18. The first and second components 16, 18 of downhole tool 900 may be single packers having the primary and secondary ports 26*a*, 26*b* and or the sensors 32 which may be located, positioned and/or provided at, in and/or adjacent to the primary and secondary ports 26*a*, 26*b* as shown in FIG. 3. The one or more sensors 32 of the first and second components 16, 18 may wirelessly transmit one or more collected measurements associated with the one or more flow pulses to the transceiver 22 which may be provided by and/or incorporated into the downhole tools 900, 1000 via the electromagnetic field 23 as shown in FIG. 3.

As shown in FIG. 14, the second component 18 may have the one or more ring sink ports 406, as similarly shown in FIG. 9 which may be utilized and or actuated to generate, for example, a pressure disturbance in the reservoir 14. The one or more sensors 32 of the tool 900 may collect one or more measurements associated with the pressure disturbance in the reservoir 14 which may have been generated by the one or more ring sink ports 406 of the second component 18. The one or more measurements collected by the one or more sensors 32 may be wirelessly transmitted to the transceiver 22 of the downhole tool 900.

A ring sink port 406 of the second component 18, which may be utilized as a sample ring sink port, may be interposed and/or located between two other ring sink ports 406 of the second component 18, which may be utilized as guard ring sink ports as shown in FIG. 14. During a focused sampling operation, the sample ring sink port and/or the guard ring sink ports may be utilized such that time which may be needed to, for example, acquire a sample and perform the IPTT test in the reservoir 14 may be reduced or substantially reduced.

The downhole tool 1000 as shown in FIG. 15 may have and/or incorporate a first component 16 which may have a port 52 as shown in FIG. 4 and/or a second component 18 which may have the primary and secondary ports 26a, 26b as shown in FIG. 1. The first and second components 16, 18 of the downhole tool 1000 may be, for example, single packers. One or more sensors 32 may be located, positioned and provided at, in or adjacent to the port 52 of the first component 16 and/or the primary and secondary ports 26a, 26b of the second component 18. The sensors 32 of the downhole tool 1000 may collect the one or more measurements and/or may wirelessly transmit the one or more collected measurements to the transceiver 22 which may be provided by and/or incorporated into the downhole tool 1000 via the electromagnetic field 23. The spacers 502, as similarly shown in FIG. 10, may connect, attach and/or join the first component 16 and the second component 18.

If the ports 52 of the first component 16 and/or the primary and secondary ports 26a, 26b of the second component 18 may be configured as peripheral ports having ring shape and may not provide proper sealing around a perimeter of the borehole 12, the peripheral ports may comprise an effective or substantially effective fluid communication with at least one axial position with respect to the reservoir 14. However, the ports 52 of the first component 52 and/or the primary and secondary ports 26a, 26b of the second component 18 may be configured as punctual ports that may not provide proper sealing around the perimeter of the borehole 12 which may not compromise the effective fluid communication with the reservoir 14 of one or more of the ports 52 and/or the primary and secondary ports 26a, 26b of the downhole tool 1000 that may be located at the same axial position with respect to the reservoir 14.

It will be appreciated that various of the above-disclosed and other features and functions, or alternatives thereof, may be desirably combined, into many other different systems or applications. Also, various presently unforeseen or unanticipated alternatives, modifications, variations or improvements therein may be subsequently made by those skilled in the art, and are also intended to be encompassed by the following claims.

What is claimed is:

1. A system for collecting at least one measurement within a borehole formed in a subsurface reservoir comprising:
   a first packer having a first expandable element and a first port formed in a first layer of the first expandable element, wherein the first expandable element comprises a flexible material configured to abut a wall of the borehole;
   a drawdown pump or drawdown piston disposed in the first packer and coupled to the first port;
   a first wireless sensor located at the first port and configured to move together with the first expandable element;
   a second packer having a second expandable element and a second port formed in a second layer of the second expandable element, wherein the second expandable element comprises the flexible material;
   a drawdown pump or drawdown piston disposed in the second packer and coupled to the second port;
   a second wireless sensor located at the second port and configured to move together with the second expandable element; and
   a wireless transceiver located at a position between the first packer and the second packer
   wherein the first and second wireless sensors are each configured to receive at least one wireless signal from said wireless transceiver, and collect at least one measurement or perform at least one task related to the borehole or subsurface reservoir about the borehole and provide a response back to the wireless transceiver.

2. The system according to claim 1, wherein the first wireless sensor and the second wireless sensor are wireless microelectromechanical system sensors and the wireless transceiver is a wireless electromagnetic transceiver.

3. The system according to claim 1, further comprising:
   a flow line formed within the first layer, or the second layer, or both, extending axially through at least a portion of the first packer, or the second packer, or both, and connected to the first port, or the second port, or both.

4. The system according to clam 3, further comprising:
   at least one valve coupled to the flow line and configured to at least one of open or close access to the flow line and the first port, or the second port, or both.

5. The system according to claim 1, further comprising:
   a sealing layer connected to at least a portion of the first packer, or the second packer, or both, wherein a third wireless sensor is located within or on top of the sealing layer, the second third wireless sensor is configured to move together with the first expandable element, the second expandable element, or both, and the sealing layer is configured to be extendable towards the wall of the borehole when a bladder incorporated into the first packer, or the second packer, or both is inflated or expanded.

6. The system according to claim 1, wherein the drawdown pump or the drawdown piston disposed in the first packer or the second packer is configured to create a flow pulse within the subsurface reservoir.

7. A method for collecting at least one measurement within a borehole formed in a subsurface reservoir, comprising:
   providing a wireless transceiver, located at a position between a first packer and a second packer on a borehole tool;
   extending a first outer surface of the first packer to be adjacent to at least a first portion of a wall of the borehole, wherein the first packer has a first port formed at the first outer surface and a first wireless sensor located at the first port, the first outer surface comprises a flexible material, and the first wireless sensor is configured to move together with the first outer surface;
   pumping fluid from the borehole into the first port using a drawdown pump or drawdown piston disposed in the first packer;
   extending a second outer surface of the second packer to be adjacent to at least a second portion of the wall, wherein the second packer has a second port formed at the second outer surface and a second wireless sensor located at the second port, the second outer surface comprises the flexible material, and the second wireless sensor is configured to move together with the second outer surface;

pumping fluid from the borehole into the second port using a drawdown pump or drawdown piston disposed in the second packer; and actuating the first wireless sensor and the second wireless sensor, via at least one wireless signal received from the wireless transceiver such that the first wireless sensor and the second wireless sensor each collects at least one measurement within one of the borehole and performs one or more tasks within the borehole.

8. The method according to claim 7, further comprising:
transmitting the at least one measurement from the first wireless sensor, or the second wireless sensor, or both, to the wireless transceiver via at least one wireless signal.

9. The method according to claim 7, wherein the at least one measurement collected by the first wireless sensor, or the second wireless sensor, or both, is at least one pressure measurement associated with one of the borehole or the reservoir and are in response to at least one flow pulse created within the reservoir by the drawdown pump or the drawdown piston disposed in the first packer or the second packer.

10. The method according to claim 7, further comprising:
controlling fluid flow within one of the borehole and the reservoir via at least one task performed by the first packer, or the second packer, or both.

11. The method according to claim 7, further comprising:
isolating at least one of the first port, or the second port, or both, via at least one valve.

12. The method according to claim 7, further comprising:
controlling fluid flow within one of the borehole and the reservoir with the first port, or the second port, or both.

13. A method for collecting at least one measurement within a borehole formed in a subsurface reservoir, comprising:

extending a first outer surface of a first packer to abut at least a first portion of a wall of the borehole, wherein the first packer has a primary port having at least one first wireless sensor the first outer surface comprises a flexible material, and the first wireless sensor is configured to move together with the first outer surface;

pumping fluid from the borehole into the primary port using a drawdown pump or drawdown piston disposed in the first packer;

extending a second outer surface of a second packer to abut at least a second portion of the wall, wherein the second packer has a secondary port having at least one second wireless sensor, the second outer surface comprises the flexible material, and the second wireless sensor is configured to move together with the second outer surface;

pumping fluid from the borehole into the secondary port using a drawdown pump or drawdown piston disposed in the second packer;

providing a wireless transceiver at a location between the first packer and the second packer;

actuating the first packer, the second packer, the first wireless sensor, and the second wireless sensor via at least one wireless signal transmitted from the wireless transceiver such that the first packer, the second packer, the first wireless sensor, and the second wireless sensor perform at least one task within the borehole; and controlling fluid flow within one of the borehole and reservoir based on the at least one task performed by the first packer, the second packer, the first wireless sensor, and the second wireless sensor.

14. The method according to claim 13, wherein the at least one task performed within the borehole comprises at least one of a local production test, a buildup test, a drawdown test, and or an interference test, or any combination thereof.

15. The method according to claim 13, wherein the at least one task performed within the borehole comprises collecting at least one measurement by the first wireless sensor, or the second wireless sensor, or both.

16. The method according to claim 15, further comprising:
determining permeability of the reservoir based on the at least one measurement, wherein the permeability of the reservoir comprises at least one of horizontal permeability of the reservoir or vertical permeability of the reservoir.

17. The method according to claim 15, further comprising:
obtaining, based on the at least one measurement, a characterization of the reservoir at or near the first packer, or the second packer, or both; and one of obtaining, based on the at least one collected measurement, an image of formation permeability for the reservoir and estimating, based on the at least one collected measurement, permeability anisotropy for the reservoir, formation anisotropy directions for the reservoir, formation heterogeneity for the reservoir, formation fractures at or near the first packer, or the second packer, or both, fracture directions or direction changes of a fracture extending away from the borehole.

18. The method according to claim 13, further comprising:
positioning an adjustable spacer axially between the first packer and the second packer, wherein the adjustable spacer joins the first and second packers to increase an axial distance between the first and second packers.

19. The method according to claim 18, further comprising:
adjusting a length of the adjustable spacer.

20. The method according to claim 13, comprising
creating a flow pulse within the subsurface reservoir using the drawdown pump or the drawdown piston disposed in the first packer or the second packer.

* * * * *